United States Patent
Hunt et al.

(10) Patent No.: US 8,352,938 B2
(45) Date of Patent: *Jan. 8, 2013

(54) SYSTEM, METHOD AND PROGRAM TO MIGRATE A VIRTUAL MACHINE

(75) Inventors: Jennifer A. Hunt, Endicott, NY (US); Steven Shultz, Endicott, NY (US)

(73) Assignee: International Business Machines Corporation, Armonk, NY (US)

( * ) Notice: Subject to any disclaimer, the term of this patent is extended or adjusted under 35 U.S.C. 154(b) by 1432 days.

This patent is subject to a terminal disclaimer.

(21) Appl. No.: 11/694,231

(22) Filed: Mar. 30, 2007

(65) Prior Publication Data

US 2007/0169121 A1 Jul. 19, 2007

Related U.S. Application Data

(62) Division of application No. 10/843,931, filed on May 11, 2004, now Pat. No. 7,257,811.

(51) Int. Cl.
G06F 9/455 (2006.01)
G06F 9/46 (2006.01)

(52) U.S. Cl. .............................. 718/1; 718/102; 718/104
(58) Field of Classification Search .............. 718/1, 104, 718/105; 711/6
See application file for complete search history.

(56) References Cited

U.S. PATENT DOCUMENTS

| | | | |
|---|---|---|---|
| 4,974,151 A | 11/1990 | Advani et al. ................ 364/200 |
| 5,592,638 A | 1/1997 | Onodera ....................... 395/406 |
| 5,805,790 A | 9/1998 | Nota et al. ................. 395/182.08 |
| 6,075,938 A | 6/2000 | Bugnion et al. |
| 6,397,242 B1 | 5/2002 | Devine et al. |
| 6,510,498 B1 | 1/2003 | Holzie et al. ................... 711/153 |
| 6,625,704 B2 | 9/2003 | Winokur ........................ 711/162 |
| 6,802,062 B1 * | 10/2004 | Oyamada et al. ................ 718/1 |
| 6,850,953 B1 | 2/2005 | Deshpande et al. |
| 6,934,755 B1 * | 8/2005 | Saulpaugh et al. ........... 709/226 |
| 7,146,305 B2 | 12/2006 | van der Made |
| 7,149,859 B2 | 12/2006 | Fujibayashi |
| 7,181,744 B2 * | 2/2007 | Shultz et al. .................. 718/104 |
| 7,191,441 B2 | 3/2007 | Abbott et al. |
| 7,203,944 B1 * | 4/2007 | van Rietschote et al. ..... 718/104 |
| 7,287,142 B2 | 10/2007 | Nakagawa |
| 7,290,259 B2 | 10/2007 | Tanaka et al. |

(Continued)

FOREIGN PATENT DOCUMENTS

EP 1380947 A2 1/2004

(Continued)

*Primary Examiner* — Emerson Puente
*Assistant Examiner* — Willy W Huaracha
(74) *Attorney, Agent, or Firm* — Cantor Colburn LLP; Dennis Jung

(57) ABSTRACT

A system, method and program product for migrating a first virtual machine from a first real computer to a second real computer or from a first LPAR to a second LPAR in a same real computer. Before migration, the first virtual machine comprises an operating system and an application in a first private memory private to the first virtual machine. A communication queue of the first virtual machine resides in a shared memory shared by the first and second computers or the first and second LPARs. The operating system and application are copied from the first private memory to the shared memory. The operating system and application are copied from the shared memory to a second private memory private to the first virtual machine in the second computer or second LPAR. Then, the first virtual machine is resumed in the second computer or second LPAR.

19 Claims, 11 Drawing Sheets

U.S. PATENT DOCUMENTS

| | | |
|---|---|---|
| 7,299,468 B2 | 11/2007 | Casey et al. |
| 7,328,437 B2 | 2/2008 | Donovan et al. |
| 7,356,679 B1 * | 4/2008 | Le et al. .......................... 713/1 |
| 7,512,769 B1 * | 3/2009 | Lowell et al. ................ 711/203 |
| 7,526,515 B2 | 4/2009 | Broussard et al. |
| 7,533,229 B1 * | 5/2009 | van Rietschote ............ 711/161 |
| 7,603,670 B1 * | 10/2009 | van Rietschote ................ 718/1 |
| 7,716,667 B2 * | 5/2010 | van Rietschote et al. ......... 718/1 |
| 7,784,053 B2 | 8/2010 | Casey et al. |
| 7,831,977 B2 | 11/2010 | Shultz et al. |
| 2003/0187915 A1 * | 10/2003 | Sun et al. ..................... 709/201 |
| 2004/0010787 A1 * | 1/2004 | Traut et al. ........................ 718/1 |
| 2005/0210082 A1 * | 9/2005 | Shutt et al. .................... 707/204 |
| 2008/0235482 A1 * | 9/2008 | Armstrong et al. ........... 711/173 |
| 2009/0235249 A1 * | 9/2009 | Kobayashi et al. ............... 718/1 |
| 2010/0122111 A1 * | 5/2010 | Allen et al. ...................... 714/3 |
| 2010/0229175 A1 * | 9/2010 | Gonzalez et al. ............. 718/104 |

FOREIGN PATENT DOCUMENTS

| | | |
|---|---|---|
| JP | 2002202959 A | 7/2002 |
| TW | 538376 B | 6/2003 |
| TW | I223279 B | 11/2004 |

* cited by examiner

SYSTEM, METHOD AND PROGRAM TO MIGRATE A VIRTUAL MACHINE

This is a divisional of U.S. patent application Ser. No. 10/843,931, entitled 'SYSTEM, METHOD AND PROGRAM TO MIGRATE A VIRTUAL MACHINE' filed May 11, 2004 now U.S. Pat. No. 7,257,811 by Hunt et al.

FIELD OF THE INVENTION

The invention relates generally to computer systems, and deals more particularly with migration of a virtual machine within a same real computer from one logical partition to another, or from one real computer to another real computer.

CROSS-REFERENCE TO RELATED APPLICATIONS

US patent application entitled "Management of Virtual Machines to Utilize Shared Resources" Ser. No. 10/425,470 filed Apr. 29, 2003 by Casey et al. is incorporated by reference as part of the present disclosure.

US patent application entitled "Management of Locks in a Virtual Machine Environment" Ser. No. 10/425,468 filed Apr. 29, 2003 by Donovan et al. is incorporated by reference as part of the present disclosure.

BACKGROUND OF THE INVENTION

A virtual machine operating system is well known today, and includes a hypervisor program, and separate virtual machines formed by the hypervisor. In an IBM z/VM operating system, the hypervisor program is called the Control Program ("CP"). Each virtual machine is also called a "user portion" or "guest". A virtual machine is a virtual sharing/partitioning of computer resources such as processor(s), memory, storage and I/O (i.e. network cards, printers and displays.) A guest operating system executes/runs on each virtual machine. One or more applications run on each guest operating system.

It was also known to logically partition a computer by logically dividing the real computer resources. The user defined each logical partition ("LPAR"), i.e. the amount of processors, memory and storage for each LPAR. Each LPAR could be allocated specific real computer resources or a share of the total computer resources. Then, in some computers, a separate hypervisor was loaded into each LPAR to form multiple virtual machines in each logical partition. Each such virtual machine was a virtual sharing of the resources allocated to its LPAR.

Even though each application and guest operating system are executing in a virtual machine, they operate as if they are running on their own private, real computer. The following is an example of how a known virtual machine utilizes its processor or share of processor time to perform work items. Each virtual machine has its own synchronization or lock function, work queue assignment function, work scheduler and associated queue of work items or tasks assigned to the virtual machine. The synchronization or lock function, work queue assignment function, work scheduler and the work queue are all private to the virtual machine in this example. The synchronization or lock function manages locks for a work queue to control which work items must run sequentially and which tasks can run in parallel. The work queue assignment function is a program function within the virtual machine which adds work items to the work queue of the virtual machine when generated by the virtual machine. The work items are added to the queue at a position based on an assignment algorithm. The assignment algorithm may consider such factors as relative priority level of each work item and the order in which work items were created, i.e. first in first out. Each work item on the queue includes information indicating its type, and therefore, which function within the virtual machine is best suited to handle it. A "work scheduler" is a program function which schedules each of the work items on its queue for execution. The work scheduler passes the work items to the appropriate function within the virtual machine for execution by the virtual processor.

It was also known for multiple virtual machines to share a work queue to distribute the work items amongst the virtual machines and their respective shares of real processors. A server virtual machine was utilized for the purpose of "hosting" this shared work queue for the other, "working" virtual machines. The shared work queue resides in memory private to the server virtual machine. When a working virtual machine creates a new work item, and the work queue assignment function for this working virtual machine decides to send this new work item to the server virtual machine, it uses a communication protocol (e.g. TCP/IP) and a virtual I/O device driver to send that work item to this server virtual machine. Then, the server virtual machine places the new work item on the shared work queue in an order determined by the server virtual machine. When the virtual CPU within a working virtual machine is available to execute a work item on the shared work queue, the work scheduler within this working virtual machine uses a communication protocol and virtual I/O device driver to make that request to the server virtual machine. In response, the server virtual machine uses a communication protocol to send a work item to the working virtual machine that made the request. While this arrangement provides a shared work queue, it requires a high overhead communication protocol to both send a work item to the work queue and obtain a work item from the work queue.

US patent application entitled "Management of Virtual Machines to Utilize Shared Resources" Ser. No. 10/425,470, filed Apr. 29, 2003 by Casey et al., discloses the "cloning" of a virtual machine, including its operating system and application(s), when the application(s) is resource constrained. This will increase the proportion of total computer resources allocated to the application(s) because there is an additional virtual machine (with its share of resources) running the application(s). This patent application is hereby incorporated by reference as part of the present disclosure. US patent application entitled "Management of Locks in a Virtual Machine Environment" Ser. No. 10/425,468, filed Apr. 29, 2003 by Donovan et al. discloses a shared memory with a work queue and work queue lock structure shared by multiple virtual machines. The multiple virtual machines can directly access the shared lock structure and shared work queue. This patent application is hereby incorporated by reference as part of the present disclosure.

It was known for a computer to include a physical communication card that was inserted into the computer. When the communication card receives a message from another computer, the communication card sends an interrupt to a CPU within the computer. In response, the CPU will invoke a program function within the computer to fetch and handle the message. The physical communication card could be removed and inserted into another computer. Any messages contained in memory within the physical communication card and not yet read by the original computer would not be available to this other personal computer. Also, messages sent to the physical communication card during its movement from the original computer to the other personal computer would be lost.

It was also known for a computer to include a physical block I/O card to write data to and read data from (disk) storage. During a write mode, the CPU of the computer passes a block of data to the block I/O, and requests that it be written to storage. In response, the block I/O card writes the data to the storage, and then sends an interrupt back to the CPU indicating that the I/O completed. When receiving the interrupt, the CPU knows that the block of data was successfully written to storage, and then can proceed accordingly, for example, erasing the data from memory. During a read mode, the CPU requests the block I/O card to read a specified block of data from storage. In response, the block I/O card reads the data from storage and writes it to a buffer accessible to the CPU. Then, the block I/O card sends an interrupt back to the CPU indicating that the I/O completed. After receiving the interrupt, the CPU can read the data from the buffer. The physical block I/O card could be removed and inserted into another computer. However, any I/O requests currently in progress on the physical block I/O card during its movement from the original computer to the other personal computer would be lost.

It was known to migrate a virtual machine from one real computer to another real computer and within one real computer from one LPAR to another LPAR. Adesse Corporation's Single System Image could save the state of a virtual machine and migrate that virtual machine, but only if there was no I/O in progress and the virtual machine had no communication devices. A research project entitled "Guest Save/Restore Facility" by Brookhaven National Laboratory's could save the state of a virtual machine and resume that virtual machine at some future time, but only if there was no I/O in progress and the virtual machine had no communication devices. MiraSoft, Inc.'s Distributed devices could save the state of a virtual machine and migrate that virtual machine, but only if there was no I/O in progress and the virtual machine had no communication devices. With these three products, no inter-virtual machine communication was permitted. There was no ability to handle "in flight" I/O, i.e. communications and data sent from one virtual machine to another virtual machine but not yet received or processed by the other virtual machine.

VMWare Corporation's VMMotion program migrates an application, including its program code, state information, registers, memory, etc., from one real computer to another real computer. The computer system in which the application executes uses a communication device which comprised a virtual network interface card. Before the migration of the application, incoming communications were stopped for some period and prior communications were completed so there would be no "in flight" communications during the migration. The computer system in which the application executes also uses a disk driver and a disk for storage of block data. Before the migration of the application, disk I/O operations were stopped for some period and prior disk I/O operations were completed so there would be no unaccounted I/O during the migration.

There is currently an Open Source project named "Partition image" directed to moving a Linux image from one real computer to another real computer. It saves the state of the Linux image to disk and this image can then be migrated to another computer. However, all communication and disk I/O must be completed and stopped before the image is saved. Also, a Tivoli System Automation program moves applications from one computer to another computer. The computer system in which the application executes uses a physical card for communication from the source computer to the target computer. The computer system uses a device driver and disk for storage of blocks of data. Before migration, the communication device is stopped for some period and the prior communications completed, so there would be no in flight communications during the migration. Likewise, disk I/O operations are stopped for some period and prior I/O requests completed before migration, so there would be no unaccounted I/O during the migration.

An object of the present invention is to efficiently migrate a virtual machine within a same real computer from one logical partition to another, or from one real computer to another real computer.

Another object of the present invention is to migrate a virtual machine while communications to the virtual machine are in progress, without losing the communications or stopping subsequent communications for an appreciable amount of time.

SUMMARY OF THE INVENTION

The invention resides in a system, computer program product and method for migrating a first virtual machine and a communication queue from a first real computer to a second real computer or from a first LPAR to a second LPAR in a same real computer. Before migration, the first virtual machine comprises an operating system and an application in a first private memory private to the first virtual machine. Before migration, the communication queue resides in a first shared memory shared by the first virtual machine and a second virtual machine in the first computer or the first LPAR. The first virtual machine is stopped in the first computer or the first LPAR. The first computer or the first LPAR communicates the operating system and application to the second computer or the second LPAR, and the second computer or the second LPAR writes the operating system and application into a second private memory private to the first virtual machine in the second computer or the second LPAR. The first computer or the first LPAR communicates the communication queue to the second computer or second LPAR, and the second computer or the second LPAR writes the communication queue into a second shared memory shared by the second and third and fourth virtual machines in the second computer or the second LPAR. The first virtual machine is resumed in the second computer or second LPAR.

According to another feature of the present invention, there is a system, method and program product for migrating a first virtual machine from a first real computer to a second real computer or from a first LPAR to a second LPAR in a same real computer. Before the migration, the first virtual machine comprises an operating system and an application in a first private memory private to the first virtual machine. A communication queue resides in a first shared memory shared by the first virtual machine and a second virtual machine in the first computer or the first LPAR. The operating system and application are copied from the first private memory to a shared storage shared by the first and second computers or the first and second LPARs. The communication queue is copied from the first shared memory to the shared storage. The second real computer or second LPAR is notified of the operating system, application and communication queue in the shared storage. The operating system and application are copied from the shared storage to a second private memory private to the first virtual machine in the second computer or second LPAR. The first virtual machine is resumed in the second computer or second LPAR. The communication queue is copied from the shared storage to a second shared memory shared by the first, third and fourth virtual machines in the second computer or second LPAR.

According to another feature of the present invention, there is a system, method and program product for migrating a first virtual machine from a first real computer to a second real computer or from a first LPAR to a second LPAR in a same real computer. Before migration, the first virtual machine comprises an operating system and an application in a first private memory private to the first virtual machine. A communication queue of the first virtual machine resides in a shared memory shared by the first and second computers or the first and second LPARs. The operating system and application are copied from the first private memory to the shared memory. The operating system and application are copied from the shared memory to a second private memory private to the first virtual machine in the second computer or second LPAR. Then, the first virtual machine is resumed in the second computer or second LPAR.

DETAILED DESCRIPTION OF THE PREFERRED EMBODIMENTS

Figure 1:
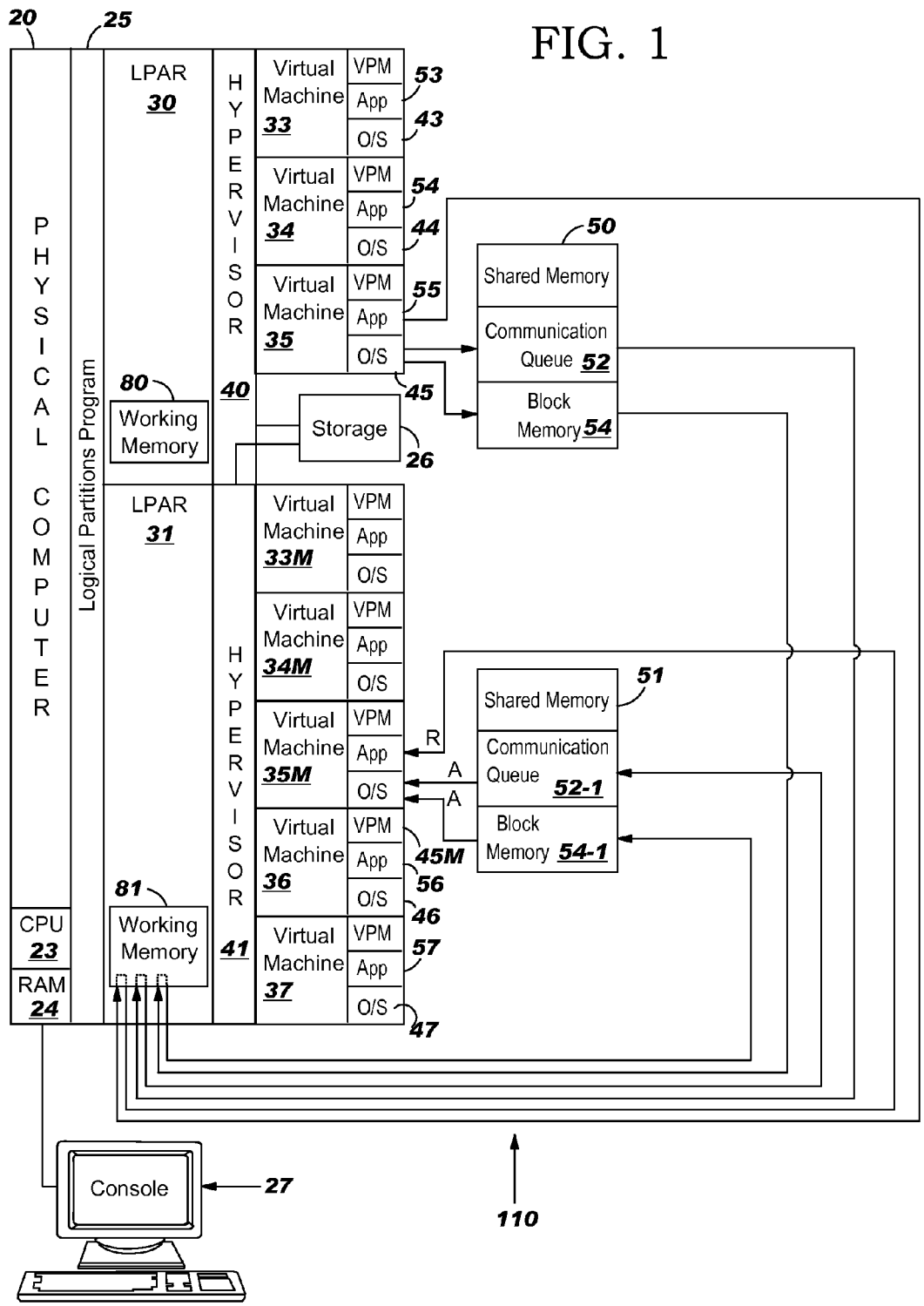
FIG. 1 is a block diagram of a real computer with two logical partitions, respective shared memories and multiple virtual machines in each logical partition, and illustrates a process according to one embodiment of the present invention for migrating a virtual machine from one logical partition to the other logical partition.

The present invention will now be described in detail with reference to the figures, wherein like reference numbers indicate like elements throughout. FIG. 1 illustrates a computer system generally designated 110 in accordance with one embodiment of the present invention. Computer system 110 includes a real/physical computer 20 which includes a CPU 23, RAM 24, logical partitioning program 25, network ports (not shown) and operator console 27. Computer system 110 also includes external (disk) storage 26. By way of example, real computer 20 can be an IBM zSeries mainframe although the present invention can be implemented in other server computers or personal computers as well. In the embodiment illustrated in FIG. 1, program 25 divides real computer 20 into logical partitions ("LPARs") 30 and 31, although program 25 could divide computer 20 into more logical partitions if desired. An LPAR is a logical partitioning of the real computer resources of computer 20. For example, if computer 20 includes eight processors, LPAR 30 can be allocated four processors and LPAR 31 can be allocated the other four processors. Program 25 also divides the total memory 24 between LPAR 30 and LPAR 31, typically as "virtual" memory. In the illustrated embodiment, both LPARs 30 and 31 can access/share storage 26 for general purposes such as to store large files and for emergency backup of memory in case of impending outage. The "virtual" memory allocations are based on allocations of virtual memory address ranges to each LPAR, irrespective of the physical location in real memory. Program 25, by address translation tables, translates the virtual addresses used by each LPAR to the real memory addresses where the actual data is stored. The virtual machines in both of the LPARs access shared storage 26 by virtual addresses.

Hypervisor programs 40 and 41 execute on LPARs 30 and 31, respectively. Hypervisor 40 divides LPAR 30 into multiple virtual machines 33, 34 and 35. In other words, hypervisor 40 logically divides and virtualizes the computer resources (including the share of processor(s) 23 and memory 24) of the LPAR 30 to form the platform for each of the virtual machines 33-35. A virtual share of real processor(s) 23 is a time share of the processor(s) allocated to LPAR 30. A virtual share of real memory 24 is a range of virtual addresses mapped to RAM 24. Hypervisor 40 allocates a range of (virtual) private memory ("VPM") mapped to RAM 24 for each virtual machine in LPAR 30. Hypervisor 40 also defines a (virtual) shared memory 50 mapped to RAM 24 for all the virtual machines 33-35 in LPAR 30. When a virtual machine 33-35 addresses its (virtual) private memory or the virtual shared memory 50, the hypervisor 40 translates the virtual memory address into a real address of real memory 24. (If needed, hypervisor 40 can also define part of shared storage 26 for use only by virtual machines 33-35 on LPAR 30 and another part of shared storage 26 for use only by the virtual machines on LPAR 31.)

For each virtual machine in LPAR 30, a guest operating system and application(s) execute on the (virtual) processor(s) allocated to the virtual machine. Guest operating systems 43-45 execute on virtual machines 33-35, respectively, and applications 53-55 execute on guest operating systems 43-45, respectively. However, there may be multiple applications executing on each guest operating system. By way of example, the guest operating systems can be the Linux (™ of Linus Torvalds) operating system or IBM CMS operating system. Other guest operating systems are also feasible such as Microsoft Windows™ operating system, Unix™ operating system, Sun Microsystems Solaris™ operating system or Hewlett Packard HP UX operating system. By way of example, applications 53-55 can be IBM DB2 data base management application, IBM Websphere application, or other application. The nature of applications 53-55 form no part of the present invention, except that they may generate or be the target of communications from other virtual machines on the same or different real computers. Also, the applications 53-55 may request to read blocks of data from or write blocks of data to "block" memory, in some cases, to their own dedicated block memory and in other cases, to block memory of other virtual machines in the same LPAR.

The guest operating system and application(s) for each virtual machine in LPAR 30 are stored in the private memory allocated to the virtual machine. The virtual machine's private memory also contains data generated by the guest operating system, application(s), program status words (also called "CPU status") for the operating system and application(s), and data registers used during processing by the guest operating system and application(s). The program status words indicate what line in the program is currently being executed or to be executed next. The program status words also indicate what interrupts are allowed, what instructions are allowed, and what memory can be accessed.

Likewise, hypervisor 41 initially divides LPAR 31 into virtual machines 36 and 37, and later, further divides LPAR 31 into additional virtual machines 33M, 34M and 35M after their migration from LPAR 30. In other words, hypervisor 41 logically divides and virtualizes the computer resources (including the share of processor(s) 23, memory 24 and storage 26) of the LPAR 31 to form each of the virtual machines 36, 37, 33M, 34M and 35M. Hypervisor 41 allocates a range of (virtual) private memory ("VPM") mapped to RAM 24 for each of these virtual machine. Hypervisor 41 also defines a (virtual) shared memory 51 mapped to RAM 24 for all the virtual machines 36, 37, 33M, 34M and 35M in LPAR 31. When a virtual machine 36, 36, 33M, 34M or 35M or an application in virtual machines 36, 37, 33M, 34M or 35M addresses its (virtual) private memory or the virtual shared memory 51, the hypervisor 41 translates the virtual memory address into a real address of real memory 24.

For each virtual machine in LPAR 31, a guest operating system and application(s) execute on the processor(s) allocated to the virtual machine. Guest operating systems 46 and 47 execute on virtual machines 36 and 37, respectively, and applications 56 and 57 execute on guest operating systems 46 and 47, respectively. However, there may be multiple applications executing on each guest operating system. By way of example, the guest operating systems can be the Linux (™ of Linus Torvalds) operating system or IBM CMS operating system. Other guest operating systems are also feasible such as Microsoft Windows™ operating system, Unix™ operating system, Sun Microsystems Solaris™ operating system or Hewlett Packard HP UX operating system. By way of example, applications 56-57 can be IBM DB2 data base management application, IBM Websphere application, or other application. The nature of applications 56-57 form no part of the present invention, except that they may generate or be the target of communications from other virtual machines on the same or different real computer. Also, the applications 56 and 57 may request to read blocks of data from or write blocks of data to "block" memory, in some cases, to their own dedicated block memory and in other cases, to block memory of other virtual machines in the same LPAR.

The guest operating system and application(s) for each virtual machine in LPAR 31 are stored in the private memory allocated to the virtual machine. The virtual machine's private memory also contains data generated by the guest operating system, application(s), program status words (also called "CPU status") for the operating system and application(s), and data registers used during processing by the guest operating system and application(s).

By way of example, each of the hypervisor programs 40 and 41 may include an existing IBM z/VM version 4.2.0 or 4.3.0 virtual machine operating system with its current capability to form each of the virtual machines from LPARs or real computers. However, hypervisors 40 and 41 also include new programming according to the present invention to migrate virtual machines and associated communication queues and block memories, as described below. The details of the existing z/VM 4.2.0 operating system are disclosed in IBM publication "z/VM 4.2.0 General Information" (Document Number: GC24-5991-03) which is available from International Business Machines Corp. at PO Box 29570, IBM Publications, Raleigh, N.C. 27626-0570 or on the WWW at www.IBM.com/shop/publications/order. This publication is hereby incorporated by reference as part of the present disclosure. In the z/VM operating system, hypervisors 40 and 41 are called Control Programs ("CPs"), and the "virtual machines" are also called "guest virtual machines".

As explained above, hypervisor 40 defines and manages a shared memory area 50 which is shared by all of the virtual machines 33-35 on LPAR 30. All virtual machines 33-35 can directly access the shared memory 50 and the data structures stored in the shared memory by appropriate address, when they know the address. However, the virtual machines in LPAR 31 (i.e. virtual machines 36 and 37 and 33M, 34M and 35M when migrated) cannot access shared memory 50. For each of virtual machines 33-35, there is a respective communication queue and a respective block memory in shared memory 50. For simplicity, FIG. 1 illustrates only one communication queue 52 and one block memory 54 for virtual machine 35, although each of the other virtual machines 33 and 34 will likewise have their own respective communication queue and block memory.

In the illustrated embodiment, as explained below with reference to FIG. 7, the communication queue 52 is a work queue to which virtual machines 33 and 34 can supply work items in the form of communications and from which virtual machine 35 can acquire the work items to handle. Thus, virtual machines 33 and 34 can communicate to virtual machine 35. Likewise, the communication queue for virtual machine 33 permits virtual machines 34 and 35 to communicate to virtual machine 33 by supplying work items, and the communication queue for virtual machine 34 permits virtual machines 33 and 35 to communicate to virtual machine 34 by supplying work items.

In the illustrated embodiment where the virtual machines 33-35 use shared memory 50, i.e. RAM, for storage of programs and data, the block memory 54 is a memory region in shared memory 50 containing files and directories. Each directory lists contents of the block memory 54. In one embodiment of the present invention where block memory 54 is shared, each of the virtual machines 33-35 can write blocks of data to and reads blocks of data from the block memory 54. In another embodiment of the present invention where the block memory is dedicated, each block memory in LPAR 30 is dedicated to a respective one of the virtual machines 33-35, such that only that one virtual machine can write blocks of data to and reads blocks of data from the block memory.

Likewise, hypervisor 41 defines and manages a shared memory area 51 which is shared by all of the virtual machines on LPAR 30, i.e. virtual machines 36 and 37, and 33M, 34M and 35M after migration. All virtual machines 36 and 37, and 33M, 34M and 35M after migration, can directly access the shared memory 51 and the data structures stored in the shared memory by appropriate address, when they know the address. However, the virtual machines in LPAR 30 (i.e. virtual machines 33-35) cannot access shared memory 51. For each of virtual machines 36 and 37, and 33M, 34M and 35M after migration, there is a respective communication queue and a respective block memory in shared memory 51. For simplicity, FIG. 1 illustrates only migrated communication queue 52-3 and migrated block memory 54-3 for migrated virtual machine 35M, although each of the other virtual machines on LPAR 31 will likewise have their own respective communication queue and block memory.

In the illustrated embodiment, as explained below with reference to FIG. 7, the communication queue 52-1 is a migrated copy of communication queue 52. After migration, communication queue 52-1 is a work queue to which virtual machines 33M and 34M can supply work items in the form of communications and from which virtual machine 35M can obtain the work items to handle. Thus, virtual machines 33M and 34M can communicate to virtual machine 35M. Likewise, the communication queue for virtual machine 36 permits virtual machine 37 to communicate to virtual machine 36, and the communication queue for virtual machine 37 permits virtual machine 36 to communicate to virtual machine 37. Virtual machines 36 and 37 can also discover, through hypervisor 41, migrated virtual machine 35M and the location of its communication queue, and thereafter supply work items to the communication queue of migrated virtual machine 35. Conversely, migrated virtual machine 35M can discover, through hypervisor 41, virtual machines 36 and 37 and the location of their communication queues, and thereafter supply work items to the communication queues of virtual machines 36 and 37. Likewise, the migrated virtual machines 33M and 34M can discover, through hypervisor 41, virtual machines 36 and 37 and the location of their communication queues, and thereafter supply work items to the communication queues of virtual machines 36 and 37.

In the illustrated embodiment where the virtual machines 36, 37, 33M, 34M and 35M use shared memory 51, i.e. RAM, for storage of data, the block memory 54-1 is a memory region in shared memory 51 containing files and directories. Block memory 54-1 is a migrated copy of block memory 54. The directories list the contents of block memory 54-1. In one embodiment of the present invention where the block memory 54-3 is shared, each of the virtual machines 36, 36, 33M, 34M and 35M can write blocks of data to and reads blocks of data from the block memory 54-3. In another embodiment of the present invention where the block memory 54-1 is dedicated, each block memory in LPAR 31 is dedicated to a respective one of the virtual machines 36, 37, 33M, 34M and 35M, such that only one virtual machine can write blocks of data to and reads blocks of data the block memory.

In the embodiment of FIG. 1, all the communication queues of virtual machines 33-35 reside in shared memory 50 and are directly accessible by all the virtual machines 33-35 in LPAR 30, but are not directly accessible by the virtual machines in LPAR 31. Thus, to maintain access by all the virtual machines original resident in LPAR 30 to the communication queues of the other virtual machines originally resident in LPAR 30, all of the virtual machines 33-35 are migrated concurrently from LPAR 30 to LPAR 31 if there is a need to migrate one or all of them. This ensures that "in flight" communications, i.e. communication items currently on a work queue in LPAR 30, will be handled by the target virtual machine and not lost. Also, as described below, the migration process is rapid so there is minimal delay to the communication process. (Likewise, the communication queues of virtual machines 36 and 37 reside in shared memory 51 and are directly accessible by the other virtual machine 37 and 36 in LPAR 30, but are not directly accessible by the virtual machines in LPAR 30. Thus, to maintain access by all the virtual machines original resident in LPAR 31 to the communication queues of the other virtual machines originally resident in LPAR 31, both the virtual machines 36 and 37 would be migrated together to LPAR 30, if there was a need to migrate one or both of them.)

Migration of virtual machines 33-35 can be initiated in different ways. For example, if hypervisor 40 knows that it is about to crash, hypervisor 40 can copy the private memory contents of each of its virtual machines 33-35 to storage 26. Then, the hypervisor 40 can initiate migration of the virtual machines 33-35 to LPAR 31 and hypervisor 41 as described below, so the virtual machines 33-35 will remain active after the crashing of hypervisor 40. As another example, a user may want to update or service hypervisor 40, and in such a case, notifies the guest operating systems 43-45 of the virtual machines 33-35. In response, the guest operating systems 43-45 will request that hypervisor 40 initiate migration of the virtual machines 33-35 to LPAR 31 and hypervisor 41 as described below, so the virtual machines 33-35 will remain active during the update or service of hypervisor 40. Virtual machines 33-35 can be migrated back to LPAR 30 and hypervisor 40 after the update or service of hypervisor 40. As another example, a systems administrator may notice that LPAR 30 is resource constrained and LPAR 31 has excess resources, so the systems administrator can notify the guest operating systems 43-45 in virtual machines 33-35 in LPAR 30 to migrate to LPAR 31. In response, the guest operating systems 43-45 of virtual machines 33-35 request that hypervisor 40 initiate migration of the virtual machines 33-35 to LPAR 31 and hypervisor 41 as described below, for load balancing purposes. (Although not shown, in this last example, there would likely be other applications running on LPAR 30 or other virtual machines on LPAR 30 that do not share the communication queues or block memories of virtual machines 33-35, and these other applications and other virtual machines need not be migrated with virtual machines 33-35.)

Figure 9:
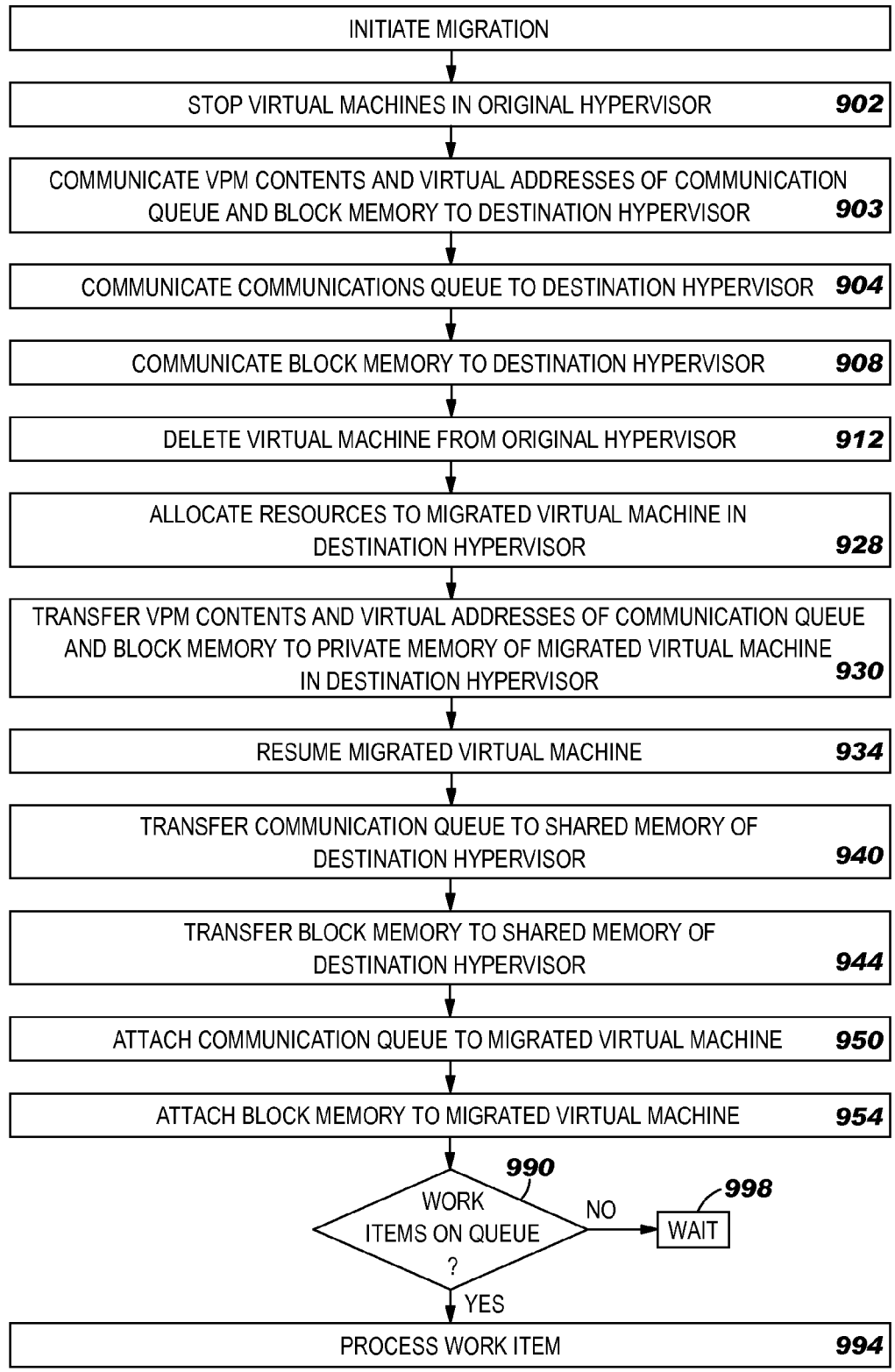
FIG. 9 is a flow chart illustrating the virtual machine migration process within the computer systems of FIGS. 1 and 2.
Figure 10:
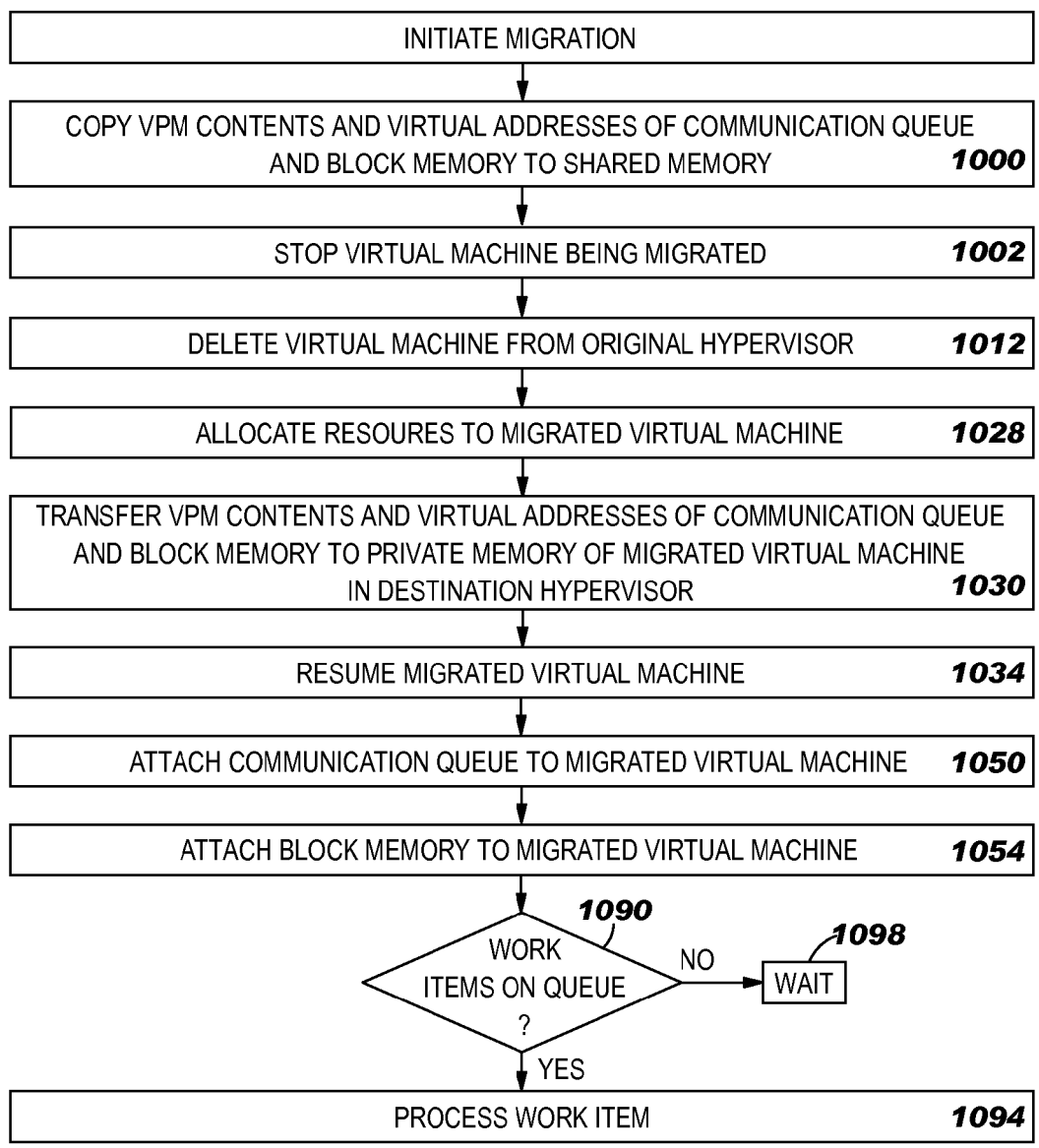
FIG. 10 is a flow chart illustrating the virtual machine migration process within the computer systems of FIGS. 3 and 4.
Figure 11:
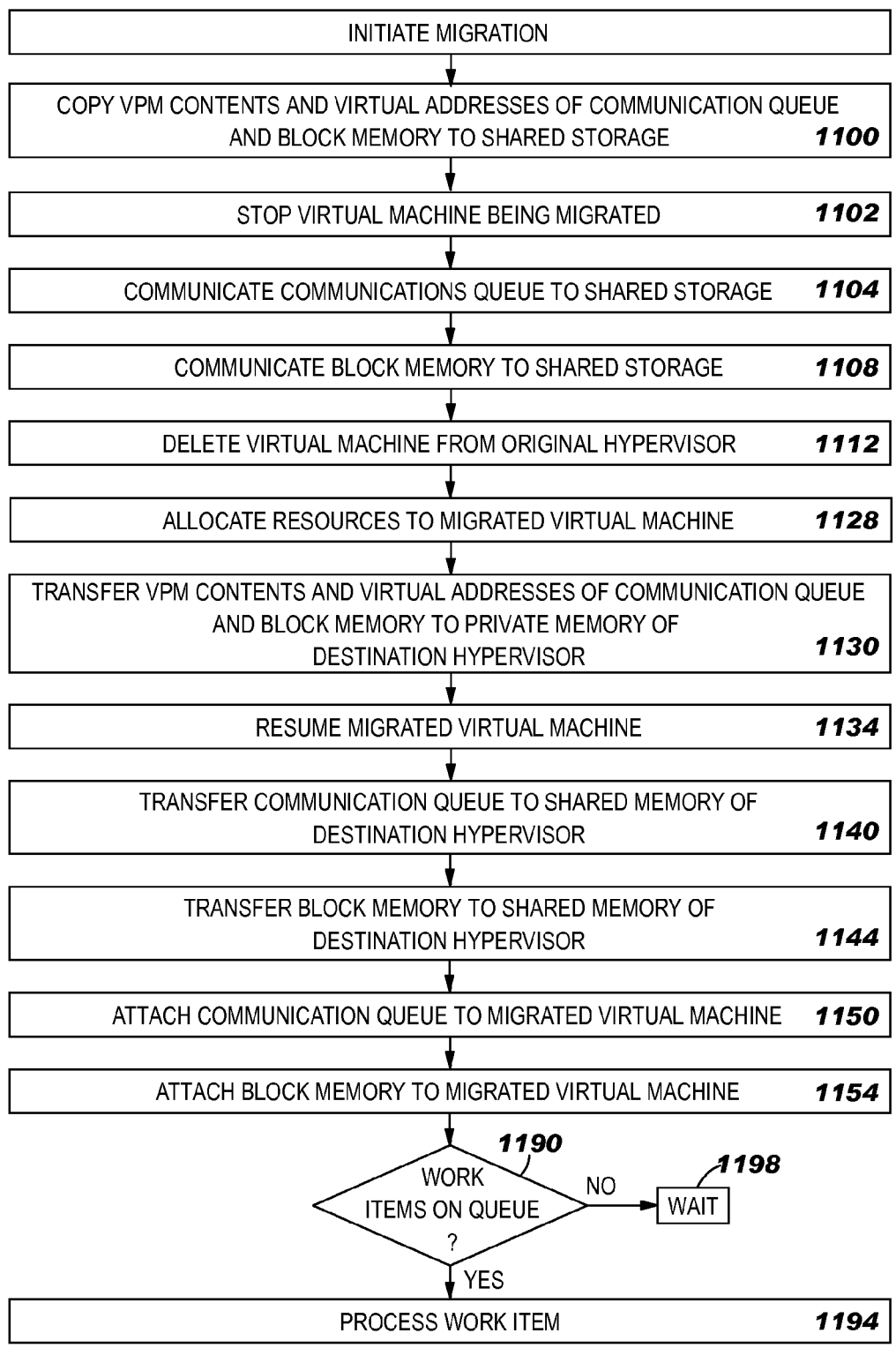
FIG. 11 is a flow chart illustrating the virtual machine migration process within the computer systems of FIGS. 5 and 6.

The following is an explanation of the migration of virtual machine 35 from LPAR 30 to LPAR 31 in system 110, with reference to FIGS. 1 and 9. This explanation applies as well to the other virtual machines 33 and 34 (and their communication queues and block memories) which are migrated simultaneously with virtual machine 35 (and communication queue 52 and block memory 54) (because virtual machines 33-35 access each others' communication queues). The migration of virtual machine 35 includes the migration of the private memory ("VPM") contents of virtual machine 35 as well as the migration of the communication queue 52 and block memory 54 of virtual machine 35, from LPAR 30 to LPAR 31.

The (virtual) private memory of virtual machine 35 in LPAR 30 stores guest operating system 45, application(s) 55, data generated by the application(s), program status words (also called "CPU status") for the operating system and application(s), and data registers used during processing by the guest operating system and application(s). (Virtual machine 35 also comprises its allocated share of computer resources from LPAR 30, but the share of computer resources from LPAR 30 is not migrated with virtual machine 35 from LPAR 30 to LPAR 31 in this embodiment of the present invention; instead, the migrated virtual machine 35M will receive its share of computer resources from LPAR 31.)

As explained above, virtual machine 35's communication queue 52 originally resides in shared memory 50, and all the virtual machines in LPAR 30 that can access this communication queue are migrated simultaneously. So, just before the migration of the communication queue 52 (and the migration of the communication queues for virtual machines 33 and 34), hypervisor 40 stops all virtual machines on LPAR 30 which access each others' communication queues so they will not attempt to add communication items to or remove communication items from any of these queues during their migration (step 902). In the illustrated example, virtual machines 33-35 access each others' communication queues, so in step 902, hypervisor 40 stops all virtual machines 33-35. As explained below, the duration of the stoppage is short, for example, five milliseconds, because there are no physical cards to move and consequently, the time required for migration is short.

It is also possible that additional virtual machines will need to be migrated simultaneously as well. In one embodiment of the present invention, each block memory is dedicated to its respective virtual machine, i.e. no other virtual machine, even in the same LPAR, can write to or read from a block memory of another virtual machine. In this embodiment, there is no need to migrate virtual machines on the same LPAR as a group on account of the block memory. However, there is still a need to migrate virtual machines on the same LPAR as a group on account of their access to each others' communication queues. However, in another embodiment of the present invention, each virtual machine in the same LPAR can access the block memory of each other virtual machine in the same LPAR. In this other embodiment, all the virtual machines on the same LPAR that can access each others' block memory need to be migrated concurrently. This group of virtual machines will generally coincide with the group of virtual machines that can access each others' communication queues, and need to be migrated concurrently anyway on account of the access to each other's communication queues.

After all the requisite virtual machines in LPAR 30 are stopped in step 902, hypervisor 40 communicates the contents of the private memory ("VPM") of virtual machine 35 in LPAR 30 to LPAR 31's working memory 81 (step 903). In step 903, hypervisor 40 also communicates the virtual addresses of communication queue 52 and block memory 54 in LPAR 30 to LPAR 31's working memory 81 in conjunction with the private memory contents of virtual machine 35. These are the virtual addresses used by virtual machine 35 to address the communication queue 52 and block memory 54 from shared memory 50. As described in more detail below, the migrated virtual machine 35M will use these same virtual addresses to address communication queue 52-1 and block memory 54-1 from shared memory 51; hypervisor 41 will map these virtual addresses to shared memory 51. Next, hypervisor 40 communicates virtual machine 35's communication queue 52 from shared memory 50 in LPAR 30 to LPAR 31's working memory 81 (step 904). Then, hypervisor 40 communicates virtual machine 35's block memory 54 from shared memory 50 in LPAR 30 to LPAR 31's working memory 81 (steps 908). If any of the foregoing data structures (i.e. VPN contents, virtual address of communication queue, virtual address of block memory, communication queue or block memory) were copied into storage 26 due to a predicted outage before the migration, and the migration occurs after LPAR 30 is restarted but before virtual machine 35 is rebuilt in memory in LPAR 30, LPAR 30 can fetch these data structures from storage 26 in order to communicate them to LPAR 31 for the migration. But, generally, hypervisor 40 fetches the VPN contents, virtual address of communication queue and virtual address of block memory from virtual machine 35's private memory 55, and fetches the communication queue and block memory from shared memory 50. The communications from LPAR 30 to LPAR 31 in steps 903 and 904 can use any available communication facility, such as known IBM zSeries IUCV, SNA or TCP/IP communication facilities. "IUCV" stands for Inter-User Communications Vehicle, and is a point-to-point communications facility that enables a program running in a virtual machine to communicate with other programs in other virtual machines via the hypervisor. An IUCV communication takes place between a source virtual machine and a target virtual machine over a predefined linkage called a "path". A "path" is a construct defined by the hypervisor. For example, when one virtual machine wants to communicate with another virtual machine via IUCV, the one virtual machine requests that the hypervisor specify a path ID for this communication. The hypervisor also notifies the other virtual machine of the path ID that the one virtual machine will be using. When the one virtual machine wants to make the communication, the one virtual machine provides the communication information to the hypervisor and also specifies the path ID. The hypervisor then receives the information, stores it in a buffer and notifies the other virtual machine via an IUCV interrupt that a communication is waiting at the specified path ID. The other virtual machine can then request the communication information from the hypervisor at the specified path ID. Each communicating virtual machine can have multiple paths, and can receive and send multiple messages on the same path simultaneously. The IUCV communication facility is further described by an "IBM z/VM V4R4.0 CP Programming Services" manual. This manual is available from International Business Machines Corporation, PO Box 29570, Raleigh, N.C. 27626-0570.

Next, virtual machine 35 requests hypervisor 40 to "delete" virtual machine 35 from LPAR 30, i.e. delete the resource allocation to virtual machine 35 from LPAR 30. In response, hypervisor 40 deletes the virtual machine 35's resource allocations (step 912). Nevertheless, hypervisor 40 will retain the description of virtual machine 35 in LPAR 30 in case a user later wants to reactivate virtual machine 35 in LPAR 30.

Next, hypervisor 41 allocates computer resources (virtual processor(s), virtual private memory, virtual shared memory, virtual private storage and virtual shared storage) from LPAR 31 for the virtual machine to be migrated (step 928). The hypervisor 41 knows that the virtual machine is waiting to be resumed in LPAR 31 (and needs virtual resources) based on the communication of the foregoing data structures. Then, hypervisor 41 copies the virtual machine private memory contents (including the virtual addresses for communication queue 52 and block memory 54) from working memory 81 to the recently allocated (virtual) private memory of the migrated virtual machine 35M in LPAR 31 (step 930). This forms migrated virtual machine 35M in LPAR 31, although virtual machine 35M is not yet resumed/activated. Migrated virtual machine 35M is identical to original virtual machine 35, although there may be some change in resource allocation, depending on the total number of virtual machines in LPAR 31 and the total amount of resources allocated to LPAR 31. Then, hypervisor 41 or a guest operating system in virtual machine 36 or 37 (that is responsible for resuming virtual machines migrated from LPAR 30) issues a command to "resume" virtual machine 35M (step 934). In response, the guest operating system 45M and application(s) within virtual machine 35M will resume execution, at the point indicated by the migrated program status (pointer).

Then, hypervisor 41 or the guest operating system in virtual machine 36 or 37 responsible for migration of virtual machines from LPAR 30 copies virtual machine 35's communication queue from LPAR 31's working memory 81 to shared memory 51 (step 940) (where it is relabeled in FIG. 1 as 52-1 for purposes of illustration). Then, hypervisor 41 or the guest operating system in virtual machine 36 or 37 responsible for migration of block memories from LPAR 30 to LPAR 31, copies block memory 54 from LPAR 31's working memory 81 to shared memory 51 (step 944) (where it is relabeled as 54-1 for purposes of illustration).

Then, the guest operating system 45M in the migrated virtual machine 35M requests that hypervisor 41 "attach" the communication queue 52-1 to the virtual machine 35M in LPAR 31 (step 950). By this attachment, the guest operating system 45M in virtual machine 35M notifies hypervisor 41 of what addresses that virtual machine 35M will use to reference its communication queue 52-1. (These were the addresses used by virtual machine 35 when it resided in LPAR 30, which addresses were copied to virtual machine 35M's virtual private memory along with the private memory contents of virtual machine 35.) In response, hypervisor 41 correlates these addresses to the locations in shared memory 51 where the communication queue 52-1 now resides. (Likewise, the other migrated virtual machines 34M and 35M will request that hypervisor 41 attach their respective communication queues to shared memory 51.) Because all the virtual machines 33-35 are migrated concurrently (in the manner described above), once resumed, they will access each others' communication queues using the same virtual address as they used in LPAR 30 before the migration. Hypervisor 41 will attach these addresses to locations in shared memory 51 (instead of shared memory 50).

Then, the guest operating system in migrated virtual machine 35M requests that hypervisor 31 "attach" the block memory 54-1 to the virtual machine 35M in LPAR 31 (step 954). By this attachment, the guest operating system in virtual machine 35M notifies the hypervisor 41 of what addresses virtual machine 35M will use for block memory 54-1. (These were the addresses used by virtual machine 35 when it resided in LPAR 30, which addresses were copied to virtual machine 35M's private memory along with the private memory contents of virtual machine 35.) In response, hypervisor 41 makes the block memory 54-3 available to the migrated virtual machine 35M by allocating this block memory to the migrated virtual machine 35M's virtual shared memory. If the other virtual machines 33-34 are migrated as well, and were able to access virtual machine 35's block memory in LPAR 30, they will use the same virtual addresses to access virtual machine 35M's block memory in LPAR 31 as they used to access block memory 54 in LPAR 30. Hypervisor 41 will translate these virtual addresses to block memory 54-3 in LPAR 31.

Next, the migrated virtual machine 35M continues execution of one or more work items, if any, which were in progress when virtual machine 35 was stopped in LPAR 30 for migration. These work items, if any, are continued at the point where they were stopped during the migration, as indicated by the program status words. If virtual machine 35M is available to perform another work item from communication queue 52-1 (decision 990, yes branch), virtual machine 35M acquires the next work item from the communication queue 52-1 and handles it as described below (step 994). If there are no more items on communication queue 52-1 (or any other migrated work queue of virtual machine 35M), then virtual machine simply waits for an interrupt indicating that there is work to be done.

As noted above, virtual machines 36 and 37 may subsequently learn of virtual machine 35M (and virtual machines 33M and 34M) by any available communication protocol initiated by 35M (e.g. IUCV). Then, if virtual machines 36 and 37 want to communicate with virtual machine 35M through communication queue 52-1 in shared memory 51, virtual machines 36 and 37 can query hypervisor 41 to learn the address of the communication queue 52-1 for virtual machine 35M. Likewise, if virtual machine 35M (and virtual machine 33M and 34M) learns of and wants to communication with virtual machines 36 and 36, virtual machine 35M (and virtual machine 33M and 34M) can query hypervisor 41 to learn the address of the respective communication queues in shared memory 51 for virtual machines 36 and 37. Also, if virtual machines 36 and 37 want to access block memory 54-1 in shared memory 51 (if permitted), either to write or read data, virtual machines 36 and 37 can query hypervisor 41 to learn the address of the block memory 54-1 for virtual machine 35M. Likewise, if virtual machine 35M learns of and wants to access virtual machine 36's and 37's block memory in shared memory 51 (if permitted), virtual machine 35M can query hypervisor 41 to learn the address of the respective block memory in shared memory 51 for virtual machines 36 and 37.

Figure 2:
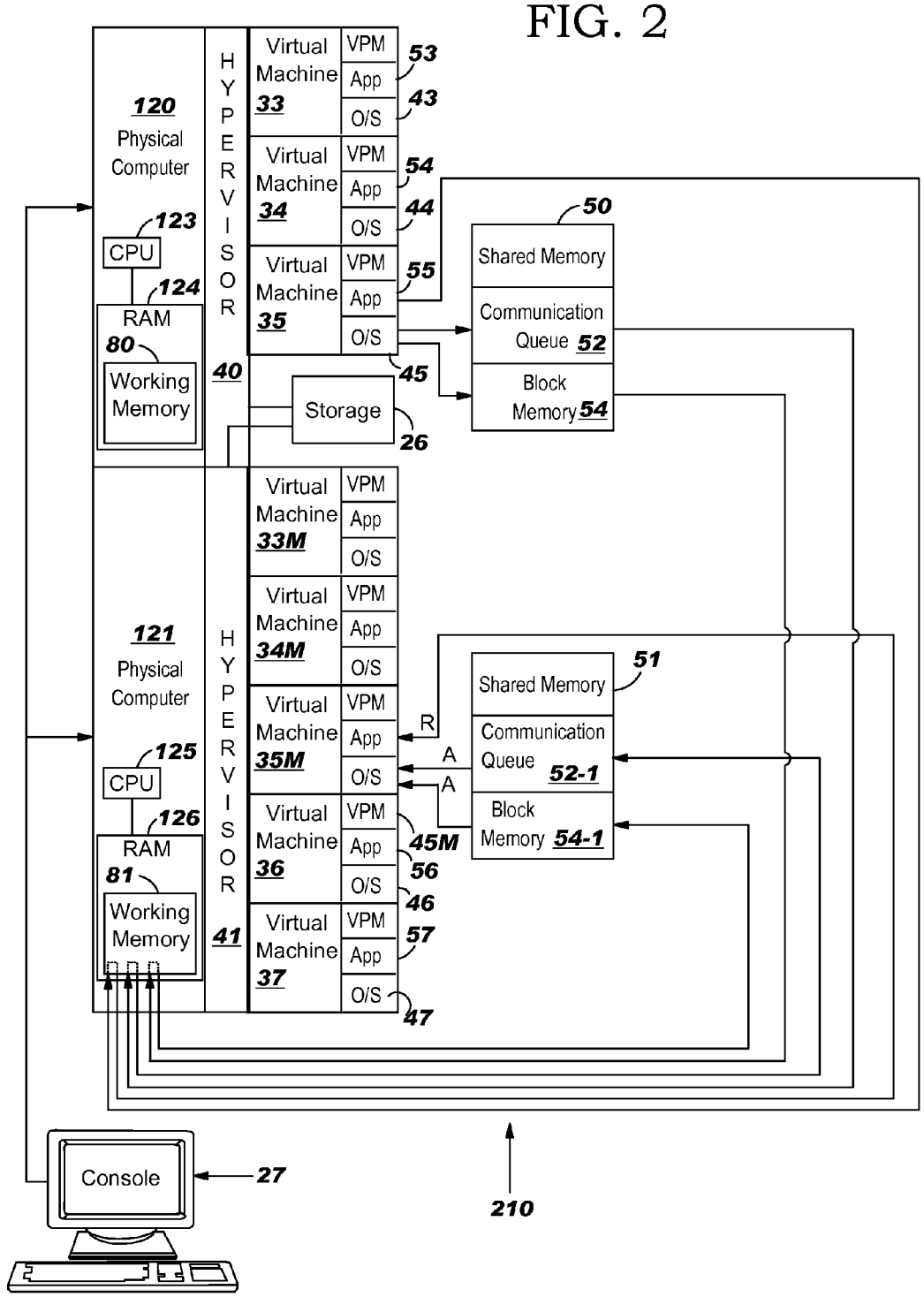
FIG. 2 is a block diagram of two separate, real computers, respective shared memories and multiple virtual machines in each real computer, and illustrates a process according to another embodiment of the present invention for migrating a virtual machine from one real computer to the other real computer.

FIG. 2 illustrates computer system 210 which comprises two separate physical computers 120 and 121 according to another embodiment of the present invention. Computer 120 includes hypervisor program 40 which defines virtual machines 33-35. Unlike system 110, computer 120 is not divided into LPARs or is a single LPAR. Computer 121 includes hypervisor program 41 which initially defines virtual machines 36 and 37, and later adds the migrated virtual machines 33M, 34M and 35M. Unlike system 110, computer 121 is not divided into LPARs or is a single LPAR. Computer 120 includes shared memory 50 for virtual machines 33-35. Computer 121 includes shared memory 51 for virtual machines 36 and 37, and later the migrated virtual machines 33M, 34M and 35M as well. Computers 120 and 121 both share storage 26 for general use and emergency backup of their respective memories. Each virtual machine in each of computers 120 and 121 includes a respective communication queue and block memory in the respective shared memory. The migration of virtual machine(s) in system 210 is the same as the migration of virtual machines in system 110, and need not be repeated here.

Figure 3:
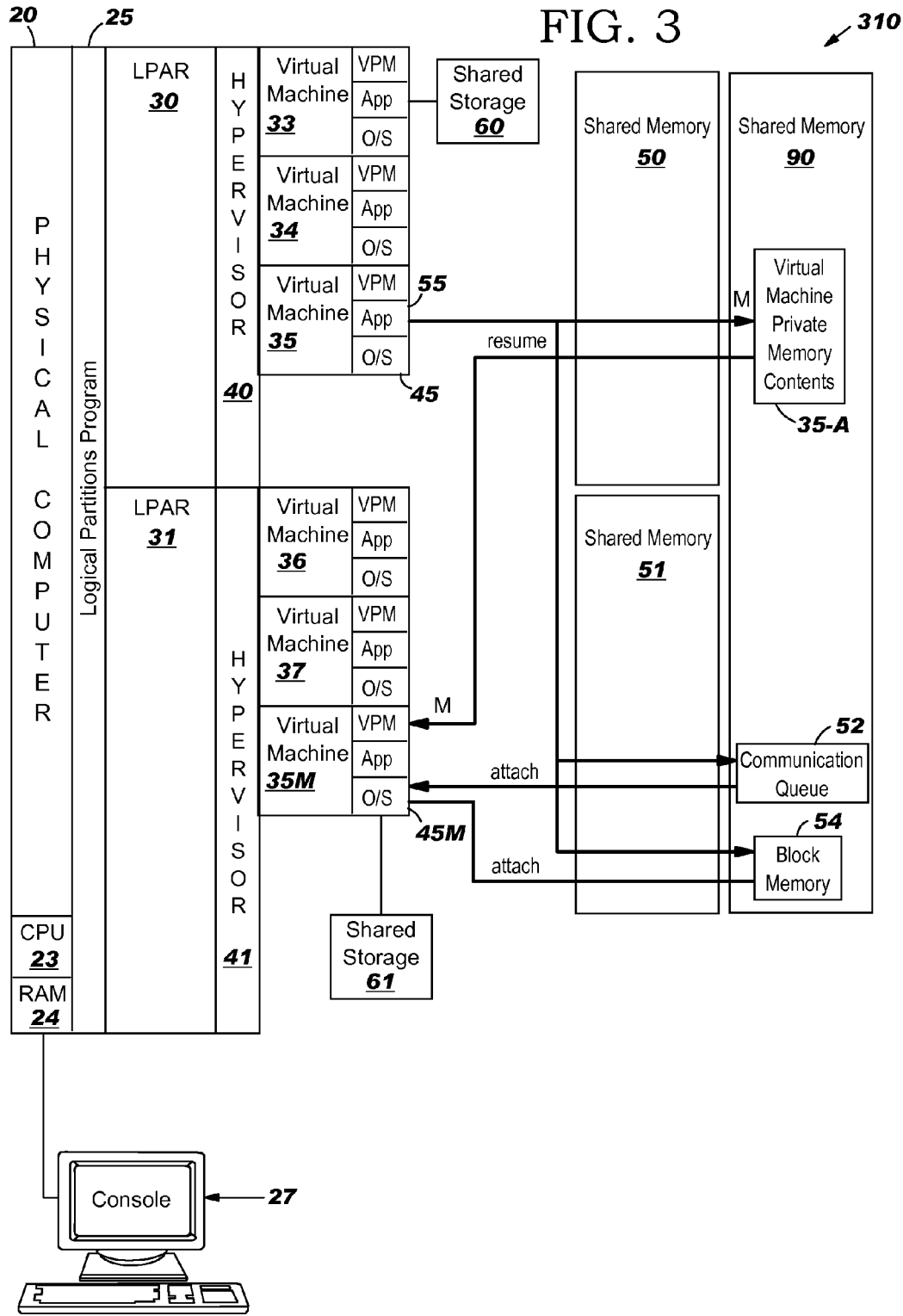
FIG. 3 is a block diagram of a real computer with two logical partitions, multiple virtual machines in each logical partition, and a memory shared by both logical partitions, and illustrates a process according to another embodiment of the present invention for migrating a virtual machine from one logical partition to the other logical partition.

FIG. 3 illustrates another computer system 310 according to another embodiment of the present invention. As in system 110, system 310 includes a single, physical computer 20, LPARs 30 and 31 and respective hypervisor programs 40 and 41. Hypervisor 40 defines virtual machines 33-35. Hypervisor 41 defines virtual machines 36, 37 and later a lone migrated virtual machine 35M as well. System 310 includes shared memory 50 and shared storage 60 for LPAR 30, and shared memory 51 and shared storage 61 for LPAR 31. However, unlike system 110, in system 310, shared storages 60 and 61 are not used in the process of migrating virtual machine 35 from LPAR 30 to LPAR 31. Instead, system 310 (unlike system 110) includes a memory 90 (i.e. a virtual area of RAM 24) shared by both LPARs 30 and 31 and hypervisors 40 and 41. Shared memory 90 is shared by all the virtual machines 33-37 and 35M on both LPARs 30 and 31. Thus, all the virtual machines on both LPARs can access all data structures within shared memory 90, provided the virtual machines know the addresses. As in system 110, each virtual machine in system 310 includes a respective private memory with the same contents as in system 110. System 310 uses shared memory 90 in the process of migrating virtual machine 35 from LPAR 30 to LPAR 31 to migrate the virtual private memory contents of the migrated virtual machine 35. However, the communication queue and block memory for each virtual machines on both LPARs 30 and 31 in system 310 is originally stored in shared memory 90 (not shared memory 50 or 60). Consequently, during migration of virtual machines 33-35 in system 310, there is no need to migrate the respective communication queues and block memories. For example, migrated virtual machine 35M in LPAR 31 directly accesses the communication queue 52 and block memory 54 from shared memory 90, just as virtual machine 35 in LPAR 30 (before migration) directly accessed the communication queue 52 and block memory 54 from shared memory 90 before migration. There is not even a need to move the communication queue 52 and block memory 54 from one location in shared memory 90 to another location in shared memory 90 for purposes of migration of virtual machine 35. Also, there is no need to stop or migrate a group of virtual machines that access each others' communication queues or block memories when it is only desired to migrate one of the virtual machines. This is because the communication queue and block memory of the migrated virtual machine do not move, and the other migrated virtual machines can continue to write to and read from the communication queue (and block memory, if permitted) of the migrated virtual machine during the migration.

The following is an explanation of the migration of virtual machine 35 from LPAR 30 to LPAR 31 in system 310, with reference to FIGS. 3 and 9. The migration of virtual machine 35 includes the migration of the private memory ("VPM") contents of virtual machine 35 from private memory in LPAR 30 to private memory in LPAR 31. There is no movement of the communication queue 52 or block memory 54; the migration only requires reattachment of both to the migrated virtual machine 35 in LPAR 31.

The (virtual) private memory of virtual machine 35 in LPAR 30 stores guest operating system 45, application(s) 55, data generated by the application(s), program status words (also called "CPU status") for the operating system and application(s), and data registers used during processing by the guest operating system and application(s). (Virtual machine 35 also comprises its allocated share of computer resources from LPAR 30, but the share of computer resources from LPAR 30 is not migrated with virtual machine 35 from LPAR 30 to LPAR 31; instead, the migrated virtual machine 35M will receive its share of computer resources from LPAR 31.) To begin the migration of virtual machine 35, hypervisor 40 copies the contents of the private memory ("VPM") of virtual machine 35 to shared memory 90 (step 1000) (where the contents are relabeled in FIG. 3 as virtual machine private memory contents 35-A for purposes of illustration). In step 1000, hypervisor 40 also copies the virtual addresses of communication queue 52 and block memory 54 to shared memory 90 in conjunction with the private memory contents of virtual machine 35. These are the virtual addresses used by virtual machine 35 to address the communication queue 52 and block memory 54 from shared memory 90. As described in more detail below, the migrated virtual machine 35M will use these same virtual addresses to address communication queue 52 and block memory 54 from shared memory 90; hypervisor 41 will map these virtual addresses to shared memory 90. At the point of the migration indicated by step 1000, virtual machine 35 is still executing in LPAR 30 and hypervisor 40. Then, hypervisor 41 stops execution of virtual machine 35 in LPAR 30 (step 1002), and then deletes virtual machine 35 from LPAR 30 (step 1028).

Virtual machine 35's communication queue 52 resides in shared memory 90 before and after the migration of virtual machine 35, and there is no movement of communication queue 52 within shared memory 90 on account of the migration. (Because communication queue 52 does not move, there is no need to stop the other virtual machines on LPAR 30 which access communication queue 52). Likewise, virtual machine 35's block memory 54 resides in shared memory 90 before and after the migration of virtual machine 35, and there is no movement of block memory 54 within shared memory 90 on account of the migration. (Because block memory 54 does not move, there is no need to stop the other virtual machines, if any, on LPAR 30 which access block memory 54).

Next, hypervisor 41 allocates computer resources (virtual processor(s), virtual private and shared memory and virtual private and shared storage) from LPAR 31 for the virtual machine to be migrated (step 1028). The hypervisor 41 knows that virtual machine 35 is waiting to be resumed in LPAR 31 (and needs virtual resources) based on user input at the time of making the migration request or a prior notification from hypervisor 40 or the guest operating system 45 in virtual machine 35. (The notification can be made via TCP/IP or any other communication protocol.) Then, hypervisor 41 copies the virtual machine private memory contents 35-A (including the virtual addresses for communication queue 52 and block memory 54) from shared memory 90 to the recently allocated LPAR 31 (virtual) private memory (step 1030). This forms migrated virtual machine 35M in LPAR 31, although virtual machine 35M is not yet resumed/activated. Migrated virtual machine 35M is identical to original virtual machine 35, although there may be some change in resource allocation, depending on the total number of virtual machines in LPAR 31 and the total amount of resources allocated to LPAR 31. Then, hypervisor 41 or a guest operating system in virtual machine 36 or 37 (that is responsible for resuming virtual machines migrated from LPAR 30) issues a command to "resume" virtual machine 35 (step 1034). In response, the guest operating system and application(s) within virtual machine 35M will resume execution, at the point indicated by the migrated program status word (pointer).

Then, the guest operating system 45M in the migrated virtual machine 35M requests that hypervisor 41 "attach" the communication queue 52 to the virtual machine 35M in LPAR 31 (step 1050). By this attachment, the guest operating system in virtual machine 35M notifies hypervisor 41 of what addresses that virtual machine 35M will use to reference communication queue 52. (These were the addresses used by virtual machine 35 to reference communication queue 52 when virtual machine 35 resided in LPAR 30, which addresses were copied to shared memory 90 along with the private memory contents of virtual machine 35.) In response, hypervisor 41 correlates these addresses to the locations in shared memory 90 where the communication queue 52 resides. Because the communication queue 52 was not moved, virtual machines 33, 34 and 35M can access communication queue 52 after the migration of virtual machine 35M, with no change to virtual machines 33 or 34. Also, virtual machines 36 and 37 can access communication queue 52 (i.e. supply work items) after the migration of virtual machine 35 the same as before the migration of virtual machine 35.

Then, the guest operating system in migrated virtual machine 35M requests that hypervisor 31 "attach" the block memory 54 to the virtual machine 35M in LPAR 31 (step 1054). By this attachment, the guest operating system 45M in virtual machine 35M notifies the hypervisor 41 of what addresses virtual machine 35M will use for block memory 54. (These were the addresses used by virtual machine 35 when it resided in LPAR 30, which addresses were copied to shared memory 90 along with the private memory contents of virtual machine 35.) In response, hypervisor 41 makes the block memory 54 available to the migrated virtual machine 35M by allocating this block memory to the migrated virtual machine 35M's virtual shared memory. Hypervisor 41 will translate these virtual addresses to block memory 54 in shared memory 90.

Next, the migrated virtual machine 35M continues execution of one or more work items, if any, which were in progress when virtual machine 35 was stopped in LPAR 30 for migration. These work items, if any, are continued at the point where they were stopped during the migration, based on the program status word. If virtual machine 35M is available to perform another work item from communication queue 52 (decision 1090, yes branch), virtual machine 35M acquires the next work item from communication queue 52 and handles it as described below (step 1094). If there are no more items on communication queue 52, or any other migrated work queue, then virtual machine simply waits for an interrupt indicating that there is more work to do (step 1098).

If virtual machines 36 and 37 did not know about virtual machine 35 in LPAR 30, they may subsequently learn of virtual machine 35M in LPAR 31 by a communication initiated by 35M using any communication protocol e.g. IUCV. Then, if virtual machines 36 and 37 want to communicate with virtual machine 35M through communication queue 52 in shared memory 90, virtual machines 36 and 37 can query hypervisor 41 to learn the address of the communication queue 52 for virtual machine 35M. Likewise, if virtual machine 35M does not already know about virtual machines 36 or 37, and learns of and wants to communication with virtual machines 36 and 36, virtual machine 35M can query hypervisor 41 to learn the address of the respective communication queues in shared memory 90 for virtual machines 36 and 37. Also, if virtual machines 36 and 37 want to access block memory 54 in shared memory 51 (if permitted), either to write or read data, virtual machines 36 and 37 can query hypervisor 41 to learn the address of the block memory 54 for virtual machine 35M if virtual machines 36 and 37 do not already know the address. Likewise, if virtual machine 35M does not already know of, but learns of and wants to access virtual machine 36's and 37's block memory in shared memory 90 (if permitted), virtual machine 35M can query hypervisor 41 to learn the address of the respective block memory in shared memory 90 for virtual machines 36 and 37.

Figure 4:
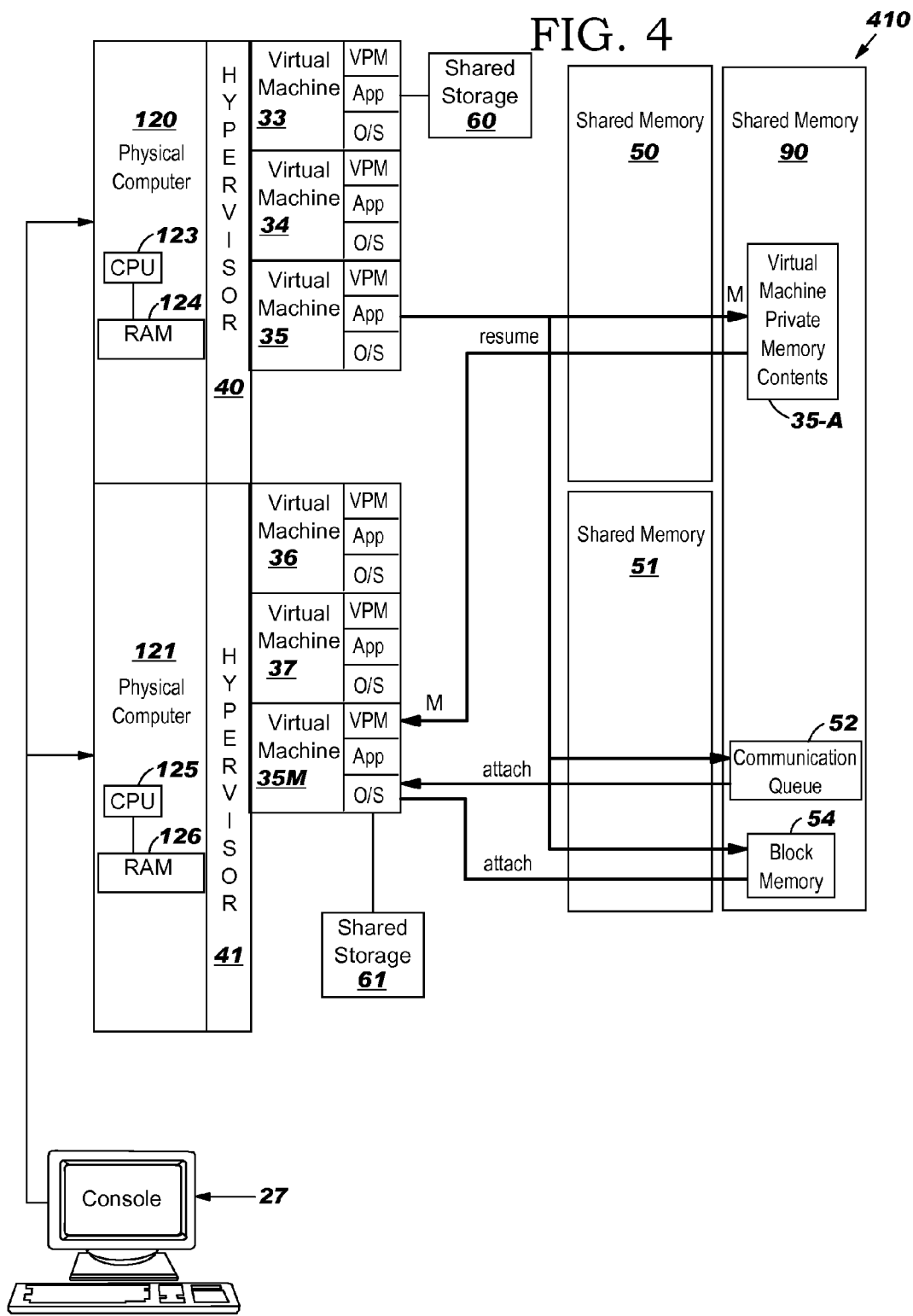
FIG. 4 is a block diagram of two separate, real computers, multiple virtual machines in each real computer, and a memory shared by both real computers, and illustrates a process according to another embodiment of the present invention for migrating a virtual machine from one real computer to the other real computer.

FIG. 4 illustrates computer system 410 which comprises two separate physical computers 120 and 121 according to another embodiment of the present invention. Computer 120 includes hypervisor program 40 which defines virtual machines 33-35. Unlike system 310, computer 120 in system 410 is not divided into LPARs or is a single LPAR. Unlike system 310, computer 121 in system 410 is not divided into LPARs or is a single LPAR. Computer system 410 is otherwise similar to computer system 310, except for the nature of the shared memory 90. In computer system 410, because there are separate, real computers 120 and 121, the shared memory 90 can be implemented as a "nonuniform memory access" device, where one real computer has faster access to the memory than the other due to the proximity of the one real computer to the memory device. In this embodiment, memory 90 can be on a card which plugs into the one real computer, and is accessible by the other real computer via a cable. Computer 121 includes hypervisor program 41 which initially defines virtual machines 36 and 37, and later adds the migrated virtual machine 35M. Each virtual machine in each computers 120 and 121 includes a respective communication queue and block memory in shared memory 90. The migration of a virtual machine in system 410 is the same as the migration of a virtual machine in system 310, and need not be repeated here.

Figure 5:
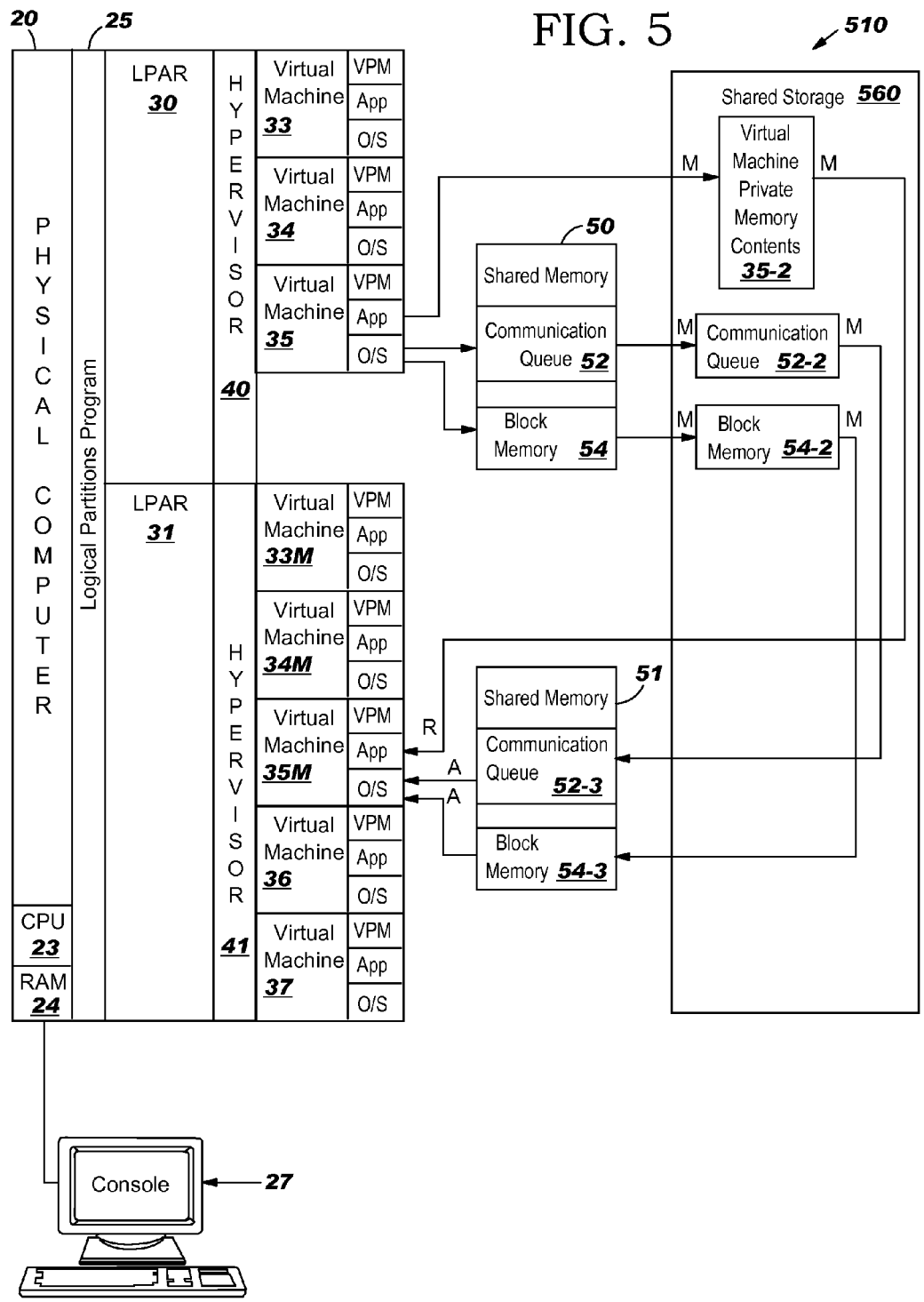
FIG. 5 is a block diagram of a real computer with two logical partitions, respective shared memories, storage shared by both logical partitions and multiple virtual machines in each logical partition, and illustrates a process according to one embodiment of the present invention for migrating a virtual machine from one logical partition to the other logical partition.

FIG. 5 illustrates another computer system 510 according to another embodiment of the present invention. As in system 110, system 510 includes a single, physical computer 20, LPARs 30 and 31 and respective hypervisor programs 40 and 41. Hypervisor 40 defines virtual machines 33-35. Hypervisor 41 defines virtual machines 36, 37 and later the migrated virtual machines 33M, 34M and 35M as well. System 510 includes shared memory 50 for LPAR 30 and shared memory 51 for LPAR 31. In both systems 110 and 510, each virtual machine includes the same private memory contents. In both systems 110 and 510, the communication queue and block memory of each virtual machine resides in the shared memory of the LPAR where the virtual machine resides. During migration of a virtual machine in both systems 110 and 510, the private memory contents are copied from the original private memory to shared storage, and the communication queue and block memory are copied from shared memory to the shared storage. However, unlike system 110, in system 510, the shared storage is common for both LPARs 30 and 31. Consequently, during migration of virtual machines 33-35 and their respective communication queues and block memories in system 510, there is no need to copy the private memory contents, communication queue and block memory from one storage to another storage or from one storage location to another. In both systems 110 and 510, there is a need to copy the private memory contents from storage to the private memory of LPAR 31, and there is a need to copy the communication queue and block memory from storage to shared memory of LPAR 31.

The following is a more detailed description of the process of migrating virtual machine 35 from LPAR 30 to LPAR 31 in system 510, which explanation applies as well to the other virtual machines 33 and 34. All three virtual machines 33-35 and their respective communication queues and block memories are migrated concurrently because all three virtual machines 33-35 access each others' communication queues.

The (virtual) private memory of virtual machine 35 in LPAR 30 stores guest operating system 45, application(s) 55, data generated by the application(s), program status words (also called "CPU status") for the operating system and application(s), and data registers used during processing by the guest operating system and application(s). (Virtual machine 35 also comprises its allocated share of computer resources from LPAR 30, but the share of computer resources from LPAR 30 is not migrated with virtual machine 35 from LPAR 30 to LPAR 31 in this embodiment of the present invention; instead, the migrated virtual machine 35M will receive its share of computer resources from LPAR 31.) To begin the migration of virtual machine 35, hypervisor 40 copies the contents of the private memory ("VPM") of virtual machine 35 to shared storage 560 (step 1100) (where the contents are relabeled in FIG. 5 as virtual machine private memory contents 35-2 for purposes of illustration). In step 1100, hypervisor 40 also copies the virtual addresses of communication queue 52 and block memory 54 to shared storage 560 in conjunction with the private memory contents of virtual machine 35. These are the virtual addresses used by virtual machine 35 to address the communication queue 52 and block memory 54 from shared memory 50. As described in more detail below, the migrated virtual machine 35M will use these same virtual addresses to address communication queue 52-3 and block memory 54-3 from shared memory 51; hypervisor 41 will map these virtual addresses to shared memory 51. At the point of the migration indicated by step 1100, virtual machine 35 is still executing in LPAR 30 and hypervisor 40.

The following explains the beginning of the migration of virtual machine 35's communication queue 52. This explanation applies as well to the migration of virtual machine 33's and 34's communication queues which are migrated simultaneously with communication queue 52. Virtual machine 35's communication queue 52 originally resides in shared memory 50. Just before the migration of the communication queue 52 (and the migration of the communication queues for virtual machines 33 and 34), hypervisor 40 stops all virtual machines on LPAR 30 which access each others' communication queues so they will not attempt to add communication items to or remove communication items from any of these queues during their migration (step 1102). In the illustrated example, virtual machines 33-35 access each others' communication queues, so in step 1102, hypervisor 40 stops all virtual machines 33-35. However, the duration of stoppage is short, for example, five milliseconds, because there are no physical cards to move. Then, hypervisor 40 copies virtual machine 35's communication queue 52 from shared memory 50 to shared storage 560 (step 1104) (where it is relabeled in FIG. 5 as communication queue 52-2 for purposes of illustration).

The following explains the beginning of the migration of virtual machine 35's block memory 54. In one embodiment of the present invention, each block memory is dedicated to its respective virtual machine, i.e. no other virtual machine, even in the same LPAR, can write to or read from a block memory of another virtual machine. In this embodiment, there is no need to migrate virtual machines on the same LPAR as a group on account of the block memory. However, there is still a need to migrate virtual machines on the same LPAR as a group on account of their access to each others' communication queues. However, in another embodiment of the present invention, each virtual machine in the same LPAR can access the block memory of each other virtual machine in the same LPAR. In this other embodiment, all the virtual machines on the same LPAR that can access each others' block memory need to be migrated concurrently. This group of virtual machines will generally coincide with the group of virtual machines that can access each others' communication queues, and need to be migrated concurrently anyway on account of the access to each other's communication queues. The following is an explanation of the migration of virtual machine 35's block memory 54. The explanation applies as well to the migration of virtual machine 33's and 34's block memories. Virtual machine 35's block memory 54 originally resides in shared memory 50. Then, hypervisor 40 copies virtual machine 35's block memory 54 from shared memory 50 to shared storage 560 (step 1108) (where it is relabeled in FIG. 5 as block memory 54-2 for purposes of illustration).

Next, virtual machine 35 deletes itself from LPAR 30 by notifying hypervisor 40 that it wants to be deleted (step 1112). In response, hypervisor 40 deletes virtual machine 35 in LPAR 30. (Likewise, the other virtual machines 33 and 34 being migrated, delete themselves as well from LPAR 30.)

Next, hypervisor 41 allocates computer resources (virtual processor(s), virtual private and shared memory and virtual private and shared storage) from LPAR 31 for the virtual machine(s) to be migrated (step 1128). The hypervisor 41 knows that virtual machine 35 is waiting to be resumed in LPAR 31 (and needs virtual resources) based on user input at the time of making the migration request or a prior notification from hypervisor 40 or the guest operating system 45 in virtual machine 35. (The notification can be made via TCP/IP, or any other communication protocol.) Then, hypervisor 41 copies the virtual machine private memory contents 35-2, (including the virtual addresses for communication queue 52 and block memory 54) from shared storage 560 to the recently allocated LPAR 31 (virtual) private memory (step 1130). This forms migrated virtual machine 35M in LPAR 31, although virtual machine 35M is not yet resumed/activated. Migrated virtual machine 35M is identical to original virtual machine 35, although there may be some change in resource allocation, depending on the total number of virtual machines in LPAR 31 and the total amount of resources allocated to LPAR 31. Then, hypervisor 41 or a guest operating system in virtual machine 36 or 37 (that is responsible for resuming virtual machines migrated from LPAR 30) issues a command to "resume" virtual machine 35 (step 1134). In response, the guest operating system 45M and application(s) within virtual machine 35M will resume execution, at the point indicated by the migrated program status (pointer).

Then, hypervisor 41 or the guest operating system in virtual machine 36 or 37 responsible for migration of virtual machines from LPAR 30, copies virtual machine 35's communication queue 52-2 from shared storage 560 to shared memory 51 (step 1140) (where it is relabeled in FIG. 5 as 52-3 for purposes of illustration). Then, hypervisor 41 or the guest operating system in virtual machine 36 or 37 responsible for migration of block memories from LPAR 30 to LPAR 31, copies block memory 54-2 from shared storage 560 to shared memory 51 (step 1144) (where it is relabeled as 54-3 for purposes of illustration).

Then, the guest operating system 45M in the migrated virtual machine 35M requests that hypervisor 41 "attach" the communication queue 52-3 to the virtual machine 35M in LPAR 31 (step 1150). By this attachment, the guest operating system 45M in virtual machine 35M notifies hypervisor 41 of what addresses that virtual machine 35M will use to reference its communication queue 52-3. (These were the addresses used by virtual machine 35 when it resided in LPAR 30, which addresses were copied to shared storage 60 along with the private memory contents of virtual machine 35.) In response, hypervisor 41 correlates these addresses to the locations in shared memory 51 where the communication queue 52-3 now resides. (Likewise, the other migrated virtual machines 34M and 35M will request that hypervisor 41 attach their respective communication queues to shared memory 51.) Because all the virtual machines 33-35 are migrated concurrently, once resumed, they will access each others' communication queues using the same virtual address as they used in LPAR 30 before the migration. Hypervisor 41 will attach these addresses to locations in shared memory 51 (instead of shared memory 50).

Then, the guest operating system in migrated virtual machine 35M requests that hypervisor 31 "attach" the block memory 54-3 to the virtual machine 35M in LPAR 31 (step 1154). By this attachment, the guest operating system in virtual machine 35M notifies the hypervisor 41 of what addresses virtual machine 35M will use for block memory 54-3. (These were the addresses used by virtual machine 35 when it resided in LPAR 30, which addresses were copied to shared storage 60 along with the private memory contents of virtual machine 35.) In response, hypervisor 41 makes the block memory 54-3 available to the migrated virtual machine 35M by allocating this block memory to the migrated virtual machine 35M's virtual shared memory. If the other virtual were able to access virtual machine 35's block memory in LPAR 30, they will use the same virtual addresses to access virtual machine 35M's block memory in LPAR 31 as they used to access block memory 54 in LPAR 30. Hypervisor 41 will translate these virtual addresses to block memory 54-3 in LPAR 31.

Next, the migrated virtual machine 35M continues execution of one or more work items, if any, which were in progress when virtual machine 35 was stopped in LPAR 30 for migration. These work items, if any, are continued at the point where they were stopped during the migration, as indicated by the program status words. If virtual machine 35M is available to perform another work item from communication queue 52-3 (decision 1190, yes branch), virtual machine 35M acquires the next work item from the communication queue 52-3 and handles it as described below (step 1194). If there are no more items on communication queue 52-3 (or any other migrated work queue of virtual machine 35M), then virtual machine simply waits for an interrupt indicating that there is more work to do (step 1198).

As noted above, virtual machines 36 and 37 may subsequently learn of virtual machine 35M (and virtual machines 33M and 34M) by communication initiated by 35M via any communication protocol e.g. IUCV. Then, if virtual machines 36 and 37 want to communicate with virtual machine 35M through communication queue 52-3 in shared memory 51, virtual machines 36 and 37 can query hypervisor 41 to learn the address of the communication queue 52-3 for virtual machine 35M. Likewise, if virtual machine 35M (and virtual machine 33M and 34M) learns of and wants to communication with virtual machines 36 and 36, virtual machine 35M (and virtual machine 33M and 34M) can query hypervisor 41 to learn the address of the respective communication queues in shared memory 51 for virtual machines 36 and 37. Also, if virtual machines 36 and 37 want to access block memory 54-3 in shared memory 51 (if permitted), either to write or read data, virtual machines 36 and 37 can query hypervisor 41 to learn the address of the block memory 54-3 for virtual machine 35M. Likewise, if virtual machine 35M learns of and wants to access virtual machine 36's and 37's block memory in shared memory 51 (if permitted), virtual machine 35M can query hypervisor 41 to learn the address of the respective block memory in shared memory 51 for virtual machines 36 and 37.

Figure 6:
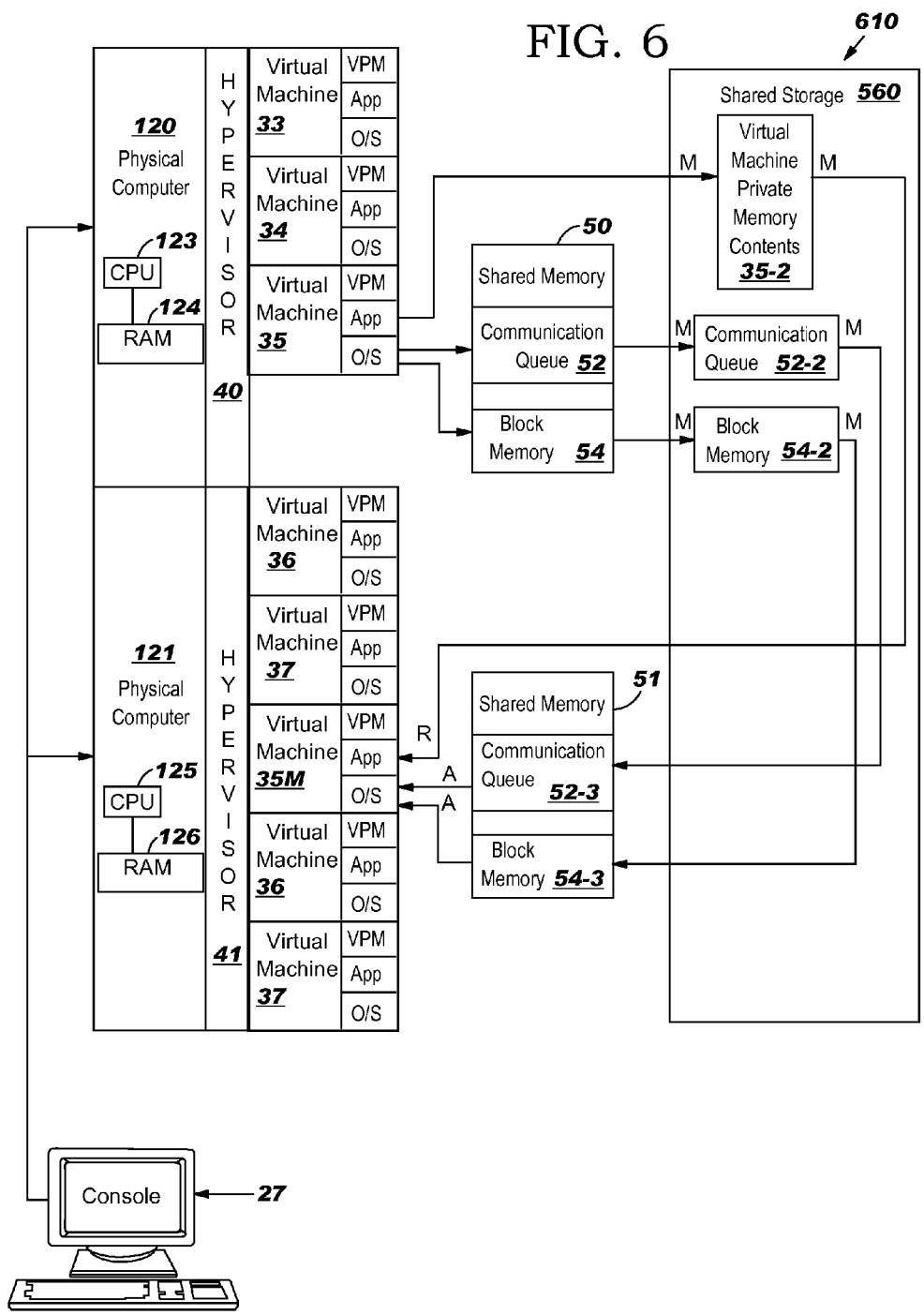
FIG. 6 is a block diagram of two separate, real computers, respective shared memories, storage shared by both computers, and multiple virtual machines in each real computer, and illustrates a process according to another embodiment of the present invention for migrating a virtual machine from one real computer to the other real computer.

FIG. 6 illustrates computer system 610 which comprises two separate physical computers 120 and 121 according to another embodiment of the present invention. Computer 120 includes hypervisor program 40 which defines virtual machines 33-35. Unlike system 510, computer 120 in system 610 is not divided into LPARs or is a single LPAR. Unlike system 510, computer 121 in system 610 is not divided into LPARs or is a single LPAR. Computer 121 includes hypervisor program 41 which defines virtual machines 36 and 37, and later the migrated virtual machines 33M, 34M and 35M as well. Computer 120 includes shared memory 50 for virtual machines 33-35. Computer 121 includes shared memory 51 for virtual machines 36 and 37, and later the migrated virtual machines 33M, 34M and 35M as well. Both computers 120 and 121 share storage 560, as in system 510. Each virtual machine in each computer 20 and 21 includes a respective communication queue and block memory in their respective shared memory. The migration of virtual machine(s) in system 610 is the same as the migration of virtual machines in system 510, and need not be repeated here.

Figure 7:
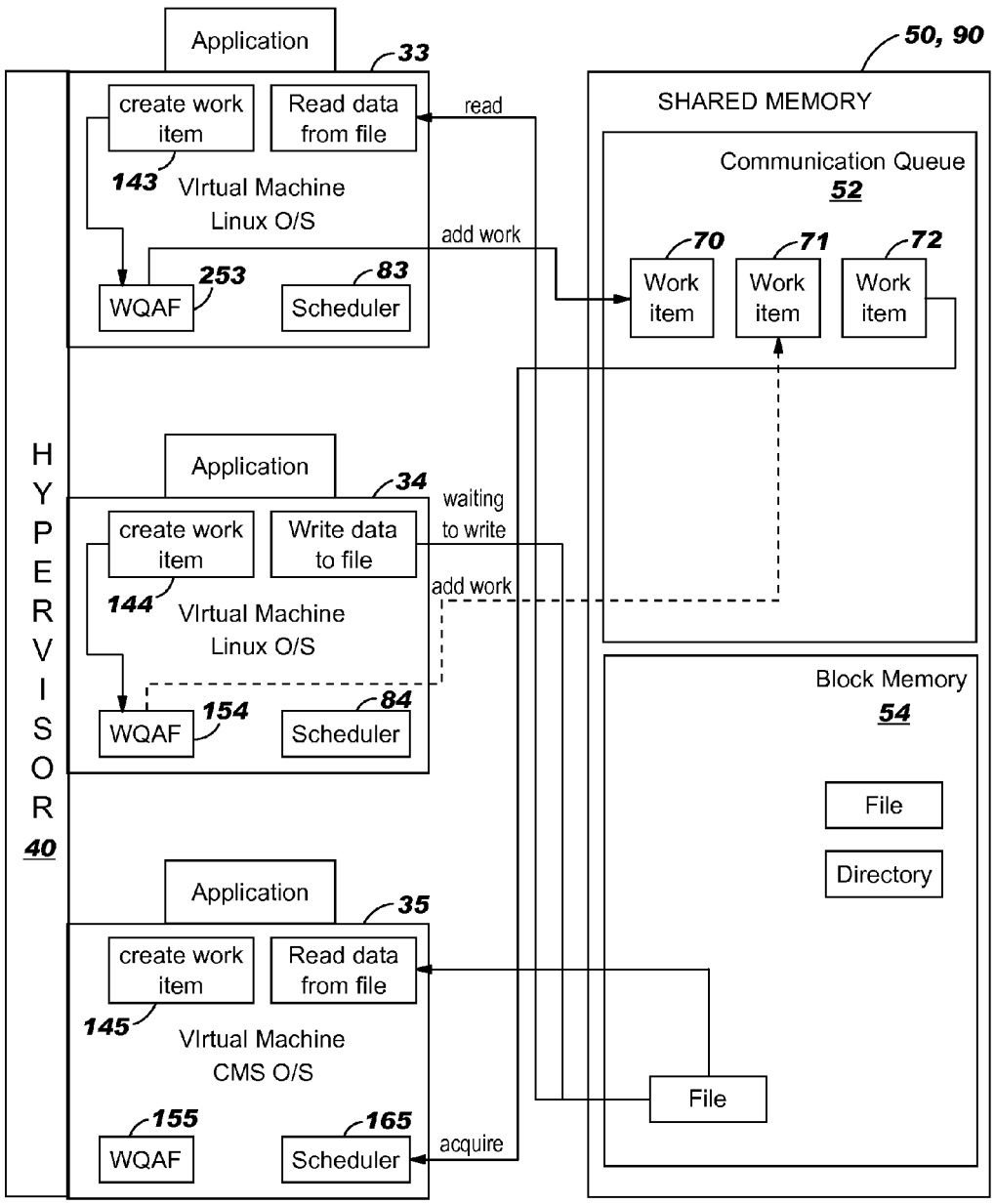
FIG. 7 is a block diagram illustrating a communication queue for a virtual machine and a shared block memory, within the shared memories of FIGS. 1, 2, 3, 4, 5 and 6.

FIG. 7 illustrates the communication queue 52 and block memory 54 in shared memory 50 or 90 and their use within all computer systems 110, 210, 310, 410, 510 and 610, before migration. (The communication queue and block memory are similarly used after migration when they reside in shared memory 51 or 90.) In the illustrated state, queue 52 has three work items 70, 71 and 73. The "work" items on "communication" queue 52 can be communications from other virtual machines as illustrated, or work items deposited by virtual machine 35 itself for execution by virtual machine 35. (Likewise, the "communication" queues of the other virtual machines can be communications from other virtual machines or work items deposited by the same virtual machine that will handle the work item.) In the illustrated example, a function 143 (such as a database function) within virtual machine 33 created work item 70, and then supplied it to a work queue assignment function ("WQAF") 153 within virtual machine 33. Then, WQAF 153 determined, based on the target (i.e. virtual machine 35) of the work/communication item, that the item should be placed on queue 52 and forwarded it to queue 52. Likewise, in the illustrated example, a function 144 (such as an internet application function) within virtual machine 34 created work item 71, and then passed it to a work queue assignment function ("WQAF") 154 within virtual machine 34. Then, WQAF 154 determined, based on the target (i.e. virtual machine 35) of the work/communication item, that the item should be placed on queue 52 and forwarded it to queue 52. (Any of virtual machines 33-35 created work item 72.) A scheduler 165, within virtual machine 35, determines when the virtual machine 35 is available to perform another work item. At that time, scheduler 165 will acquire a work item from queue 52, such as work item 72, indicated by a queue pointer. Then, scheduler 165 will parse the work item to determine the appropriate function within the virtual machine 35 to handle the work item. Then, scheduler 165 will pass the work item to that function for handling. Because queue 52 resides in shared memory, and scheduler 165 checks the queue 52 for a new item after completing the previous work item or otherwise when it has capacity to execute another work item, there is no need for an interrupt to alert scheduler 165 when an item is waiting on the queue 52 for execution. However, in one embodiment of the present invention, virtual machine 35 goes into an idle state when it has no work items to perform. In such a case, when a new work item arrives on the queue 52 for virtual machine 35, the virtual machine that put the work on queue 52 sends an interrupt to virtual machine 35 to wake up virtual machine 35. In response, virtual machine 35 will then automatically check queue 52 for a new work item.

In the illustrated embodiment of systems 110, 210, 310, 410, 510 and 610, each block memory is a region of shared memory to store files and a respective directory listing the files in the memory region. The block memories for virtual machines 33, 34 and 35 comprise respective regions of shared memory 50 or 90, and the block memories for virtual machines 36, 37, 33M, 34M and 35M comprise respective regions of shared memory 51 or 90. In the embodiment illustrated in FIG. 7, different virtual machines can write blocks to and read blocks from the block memory of another virtual machine. Thus, virtual machines 33-35 have respective device drivers (not shown) to write blocks of data to and read data from the block memories from any of the virtual machines 33-35. Any of the virtual machines 33-35 can transfer a block of data to any of the other virtual machines 33-35 or use their shared memory for storage of its own blocks of data. Likewise, virtual machines 36, 37, 33M, 34M and 35M have respective device drivers (not shown) to write blocks of data to and read data from the block memories of any of the virtual machines 36, 37, 33M, 34M and 35M. Thus, any of the virtual machines 36, 37, 33M, 34M and 35M can transfer a block of data to any of the other virtual machines 36, 37, 33M, 34M or 35M, or use the shared memory for storage of its own blocks of data.

Figure 8:
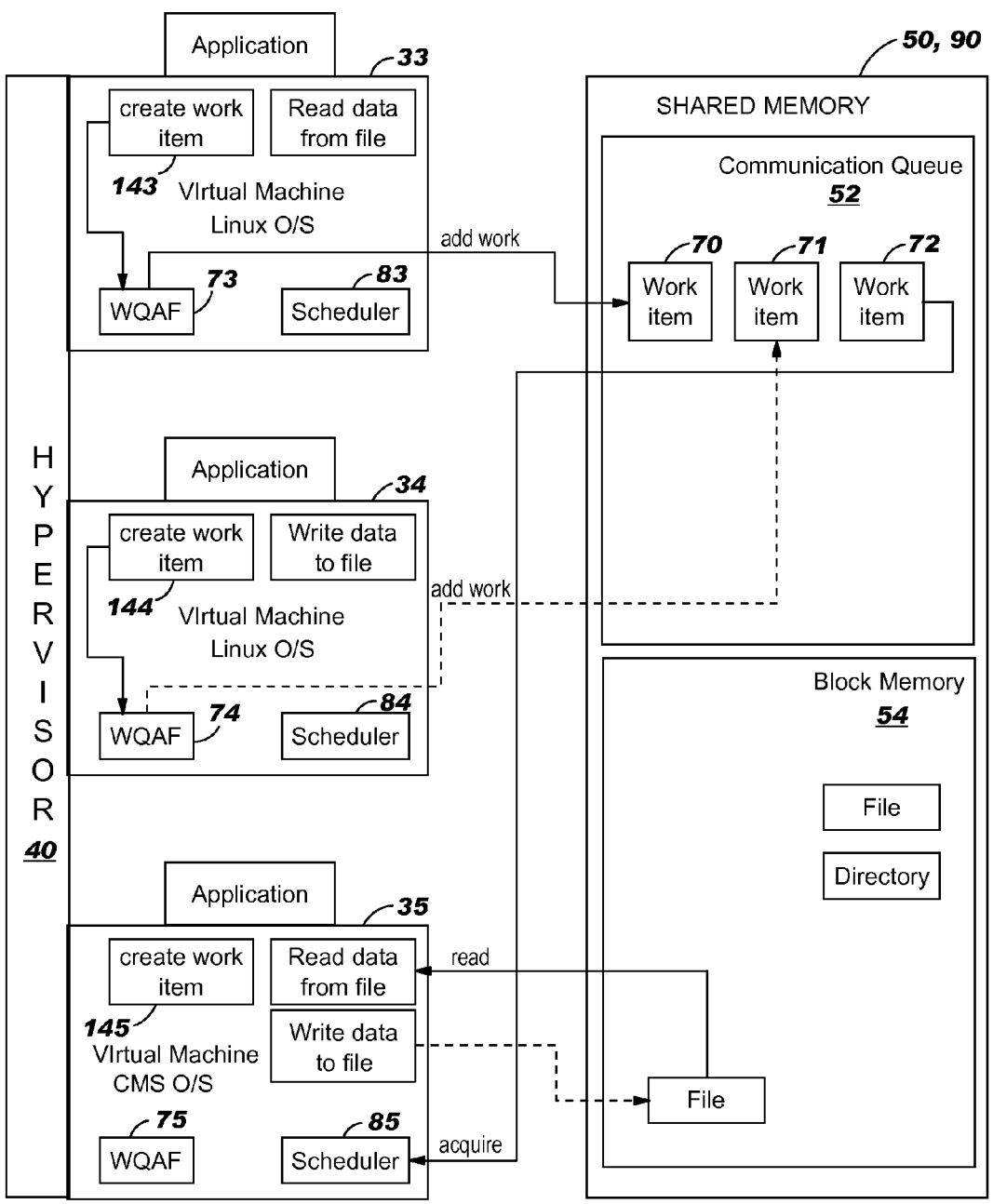
FIG. 8 is a block diagram illustrating a communication queue and a dedicated block memory for a virtual machine, within the shared memories of FIGS. 1, 2, 3, 4, 5 and 6.

FIG. 8 illustrates another embodiment of the block memories, where each virtual machine has a dedicated block memory, and cannot write to or read from the block memory of any other virtual machine. Thus, each virtual machine can write a block of data to its own block memory to free up its private memory, and then read back the block of data when needed in private memory.

Based on the foregoing, a computer system embodying the present invention has been disclosed. However, numerous modifications and substitutions can be made without deviating from the scope of the present invention. For example, each virtual machine can have other work queues that are migrated along with the communication queue described above. Therefore, the present invention has been disclosed by way of illustration and not limitation, and reference should be made to the following claims to determine the scope of the present invention.

The invention claimed is:

1. A method for migrating a first virtual machine and a communication queue, including at least one work item, from a first real computer to a second real computer, before migration, said first virtual machine having an operating system and an application in a first private memory private to said first virtual machine, before migration, said communication queue, including said at least one work item, residing in a first shared memory shared and accessible by said first virtual machine and a plurality of additional virtual machines in said first real computer, said method comprising the steps of:

stopping processing in said first virtual machine and all of said plurality of additional virtual machines that includes a second virtual machine in said first real computer to prevent said first virtual machine and said plurality of additional virtual machines from updating said communication queue in said first real computer;

while processing in said first machine and the plurality of additional virtual machines is are stopped, said first real computer communicating said operating system, said application and said communication queue, including said at least one work item, to said second real computer, and said second real computer writing said operating system and application into a second private memory in said second real computer, and said second real computer writing said communication queue, including said at least one work item, into a second shared memory in said second real computer; and allocating said second private memory and other resources in said second real computer for a migrated virtual machine corresponding to said first virtual machine and a plurality of additional migrated virtual machines corresponding to each of the plurality of additional virtual machines, and granting said migrated virtual machine access to said communication queue, including said at least one work item, in said second shared memory.

2. A method as set forth in claim 1 wherein said other resources include a share of a processor, and further comprising the subsequent step of executing said operating system and said application in said migrated virtual machine in said second real computer.

3. A method as set forth in claim 1 further comprising the steps of:

said first real computer communicating to said second real computer an address of said communication queue used by said first virtual machine in said first real computer, and said real second computer writing said address into said second private memory such that said migrated virtual machine will use said address to access said communication queue in said second shared memory.

4. A method as set forth in claim 1 further comprising the step of:

said first real computer communicating a program status word of said application or said operating system to said second real computer such that said migrated virtual machine will use said program status word to resume execution of said application or said operating system in said migrated virtual machine where said application or operating system stopped its execution in said first virtual machine in said first real computer.

5. A method as set forth in claim 1 wherein said at least one work item comprises first and second work items; and further comprising the steps of:

said first virtual machine supplying said first work item to said communication queue at an address in said first real computer before the step of stopping said first virtual machine; and said migrated virtual machine supplying said second work item to said communication queue in said second real computer at said address in said second real computer.

6. A system for migrating a first virtual machine and a communication queue, including at least one work item, from a first real computer to a second real computer, before migration, said first virtual machine having an operating system and an application in a first private memory private to said first virtual machine, before migration, said communication queue, including said at least one work item, residing in a first shared memory shared and accessible by said first virtual machine and a plurality of additional virtual machines that includes a second virtual machine in said first real computer, said system comprising:

means for stopping processing in said first virtual machine and all of said plurality of additional virtual machines in said first real computer to prevent said first virtual machine and said plurality of additional virtual machines from updating said communication queue in said first real computer;

said first real computer including means that operate while said first virtual machine and said plurality of additional virtual machines are stopped, for communicating said operating system, said application and said communication queue, including said at least one work item, to said second real computer, and said second real computer including means for writing said operating system and application into a second private memory in said second real computer, and said second real computer including means for writing said communication queue, including said at least one work item, into a second shared memory in said second real computer; and means for allocating said second private memory and other resources in said second real computer for a migrated virtual machine corresponding to said first virtual machine, and granting said migrated virtual machine access to said communication queue, including said at least one work item, in said second shared memory.

7. A system as set forth in claim 6 wherein said other resources include a share of a processor, and further comprising means for executing said operating system and said application in said migrated virtual machine in said second real computer.

8. A system as set forth in claim 6 further comprising:
means within said first real computer for communicating to said second real computer an address of said communication queue used by said first virtual machine in said first real computer; and
means within said second real computer for writing said address into said second private memory such that said migrated virtual machine will use said address to access said communication queue in said second shared memory.

9. A system as set forth in claim 6 further comprising:
means within said first real computer for communicating a program status word of said application or said operating system to said second real computer such that said migrated virtual machine will use said program status word to resume execution of said application or said operating system in said migrated virtual machine where said application or operating system stopped its execution in said first virtual machine in said first real computer.

10. A system as set forth in claim 6 further comprising:
means within said second virtual machine supplying said one work item to said communication queue before the step of stopping said first virtual machine and said second virtual machine;
means within said first real computer, that operate while processing in said first and second virtual machines is stopped, for communicating said operating system and an application of said second virtual machine to said second real computer, and means within said second read computer for writing said operating system and application of said second virtual machine into a third private memory in said second real computer; and
means for allocating said third private memory and other resources in said second real computer for another migrated virtual machine corresponding to said second virtual machine and granting said other migrated virtual machine access to said communication queue in said second shared memory.

11. A system as set forth in claim 6 wherein said at least one work item comprises first and second work items; and further comprising:
means within said first virtual machine for supplying said first work item to said communication queue at an address in said first real computer before stopping of said first virtual machine;
means within said migrated virtual machine for supplying said second work item to said communication queue in said second real computer at said address in said second real computer.

12. A method for migrating a first virtual machine and a communication queue, including at least one work item, from a first logical partition ("LPAR") to a second logical partition in a same real computer, before migration, said first virtual machine having an operating system and an application in a first private memory, to said first virtual machine, before migration, said communication queue, including said at least one work item, residing in a first shared memory shared and accessible by said first virtual machine and a plurality of additional virtual machines that includes a second virtual machine in said first LPAR, said method comprising the steps of:
stopping processing in said first virtual machine and all of aid plurality of additional virtual machines in said first LPAR to prevent said first virtual machine and said second virtual machine from updating said communication queue in said first LPAR;
while processing in said first virtual machine and said plurality of additional virtual machines is stopped, said first LPAR communicating said operating system, said application and said communication queue, including said at least one work item, to said second LPAR, and said second LPAR writing said operating system and application into a second private memory in said second LPAR, and said second LPAR writing said communication queue, including said at least one work item, into a second shared memory in said second LPAR; and
allocating said second private memory and other resources in said second LPAR for a migrated virtual machine corresponding to said first virtual machine, and granting said migrated virtual machine access to said communication queue, including said at least one work item, in said second shared memory.

13. A method as set forth in claim 12 wherein said other resources include a share of a processor, and further comprising the subsequent step of executing said operating system and said application in said migrated virtual machine in said second LPAR.

14. A method as set forth in claim 12 further comprising the steps of:
said first LPAR communicating to said second LPAR an address of said communication queue used by said first virtual machine in said first LPAR, and said second LPAR writing said address into said second private memory such that said migrated virtual machine will use said address to access said communication queue in said second shared memory.

15. A method as set forth in claim 12 further comprising the steps of:
said first LPAR communicating a program status word of said application or said operating system to said second LPAR such that said migrated virtual machine will use said program status word to resume execution of said application or said operating system in said migrated virtual machine where said application or operating system stopped its execution in said first virtual machine in said first LPAR.

16. A system for migrating a first virtual machine and a communication queue, including at least one work item, from a first LPAR to a second LPAR, before migration, said first virtual machine having an operating system and an application in a first private memory private to said first virtual machine, before migration, said communication queue, including said at least one work item, residing in a first shared memory shared and accessible by said first virtual machine and a plurality of additional virtual machines that includes a second virtual machine in said first LPAR, said system comprising:
means for stopping processing in said first virtual machine and all of said plurality of additional virtual machines in said first LPAR to prevent said first virtual machine and said plurality of additional virtual machines from updating said communication queue in said first LPAR;
said first LPAR including means that operate while processing in said first virtual machine and said plurality of additional virtual machines is are stopped, for communicating said operating system, said application and said communication queue, including said at least one work item, to said second LPAR, and said second real computer including means for writing said operating system and application into a second private memory in said second LPAR, and said second LPAR including means for writing said communication queue, including said at least one work item, into a second shared memory in said second LPAR; and means for allocating said second private memory and other resources in said second LPAR for a migrated virtual machine corresponding to said first virtual machine, and granting said migrated virtual machine access to said communication queue, including said at least one work item, in said second shared memory.

17. A system as set forth in claim 16 wherein said other resources include a share of a processor, and further comprising means for executing said operating system and said application in said migrated virtual machine in said second LPAR.

18. A system as set forth in claim 16 further comprising:

means within said first LPAR for communicating to said second LPAR an address of said communication queue used by said first virtual machine in said first LPAR; and means within said second LPAR for writing said address into said second private memory such that said migrated virtual machine will use said address to access said communication queue in said second shared memory.

19. A system as set forth in claim 16 further comprising:

means within said first LPAR for communicating a program status word of said application or said operating system to said second LPAR such that said migrated virtual machine will use said program status word to resume execution of said application or said operating system in said migrated virtual machine where said application or operating system stopped its execution in said first virtual machine in said first LPAR.

* * * * *